(12) United States Patent
Schmieder et al.

(10) Patent No.: US 10,670,858 B2
(45) Date of Patent: Jun. 2, 2020

(54) METHODS AND APPARATUS FOR MAINTAINING AND ACCURATELY DETERMINING THE POSITION OF A MOVEABLE ELEMENT

(71) Applicant: Light Labs Inc., Redwood City, CA (US)

(72) Inventors: James Schmieder, Wayland, NY (US); Liang-Jiun Lin, Keelung (TW)

(73) Assignee: Light Labs Inc., Redwood City, CA (US)

( * ) Notice: Subject to any disclaimer, the term of this patent is extended or adjusted under 35 U.S.C. 154(b) by 162 days.

(21) Appl. No.: 15/600,783

(22) Filed: May 21, 2017

(65) Prior Publication Data
US 2018/0335620 A1 Nov. 22, 2018

(51) Int. Cl.
*G02B 26/08* (2006.01)

(52) U.S. Cl.
CPC .................. *G02B 26/0816* (2013.01)

(58) Field of Classification Search
CPC .............. G02B 26/085; G02B 26/0833; G02B 26/0816
See application file for complete search history.

(56) References Cited

U.S. PATENT DOCUMENTS

| 4,544,241 A | 10/1985 | LaBudde et al. |
| 5,596,446 A * | 1/1997 | Plesko ...................... G02B 3/14 235/462.33 |
| 5,982,521 A * | 11/1999 | Bessho ................ G02B 26/105 347/260 |
| 8,553,106 B2 | 10/2013 | Scarff |
| 9,197,816 B2 | 11/2015 | Laroia |
| 9,270,876 B2 | 2/2016 | Laroia |
| 9,282,228 B2 | 3/2016 | Laroia |
| 9,325,906 B2 | 4/2016 | Laroia |
| 9,374,514 B2 | 6/2016 | Laroia |
| 9,423,588 B2 | 8/2016 | Laroia |
| 9,426,365 B2 | 8/2016 | Laroia et al. |
| 9,451,171 B2 | 9/2016 | Laroia |

(Continued)

FOREIGN PATENT DOCUMENTS

| WO | 2009145401 A1 | 12/2009 |
| WO | 2012089895 A1 | 7/2012 |

*Primary Examiner* — Kimberly N. Kakalec
(74) *Attorney, Agent, or Firm* — Straub & Straub; Michael P. Straub; Stephen T. Straub

(57) ABSTRACT

Methods and apparatus for maintaining, adjusting and/or accurately determining the position of a moveable element, e.g., a moveable shaft mounted component are described. The moveable component may be, for example, a mirror or mirror support of a camera module. A hall sensor is used to measure distance to the moveable component. To facilitate the distance measurement a magnet is secured to the moveable component. The hall sensor is used to determine the distance between the magnet and sensor. A metal plate is placed along a side of one of the supports used to support the shaft to which the moveable component is attached. The magnet which facilitates distance measurement is attracted to the plate reducing the risk of side to side movement even when the shaft fits loosely in the supports and is rotated. The magnet facilitates distance measurements and reliable control of position relative to the sidewall plate.

19 Claims, 18 Drawing Sheets

(56) References Cited

U.S. PATENT DOCUMENTS

| | | |
|---|---|---|
| 9,462,170 B2 | 10/2016 | Laroia et al. |
| 9,467,627 B2 | 10/2016 | Laroia |
| 9,544,501 B2 | 1/2017 | Laroia |
| 9,544,503 B2 | 1/2017 | Shroff |
| 9,547,160 B2 | 1/2017 | Laroia |
| 9,549,127 B2 | 1/2017 | Laroia |
| 9,551,854 B2 | 1/2017 | Laroia |
| 9,554,031 B2 | 1/2017 | Laroia et al. |
| 9,557,519 B2 | 1/2017 | Laroia |
| 9,557,520 B2 | 1/2017 | Laroia |
| 9,563,033 B2 | 2/2017 | Laroia |
| 9,568,713 B2 | 2/2017 | Laroia |
| 9,578,252 B2 | 2/2017 | Laroia |
| 9,671,595 B2 | 6/2017 | Laroia |
| 9,686,471 B2 | 6/2017 | Laroia et al. |
| 9,690,079 B2 | 6/2017 | Laroia |
| 9,736,365 B2 | 8/2017 | Laroia |
| 9,749,511 B2 | 8/2017 | Laroia |
| 9,749,549 B2 | 8/2017 | Shroff |
| D802,646 S | 11/2017 | Laroia et al. |
| 9,824,427 B2 | 11/2017 | Pulli et al. |
| 2004/0027695 A1 | 2/2004 | Lin |
| 2006/0187311 A1 | 8/2006 | Labaziewicz et al. |
| 2008/0247745 A1 | 10/2008 | Nilsson |
| 2010/0013906 A1 | 1/2010 | Border et al. |
| 2013/0020470 A1 | 1/2013 | Luo et al. |
| 2013/0258044 A1 | 10/2013 | Betts-Lacroix |
| 2014/0098350 A1* | 4/2014 | Abele ............ G02B 26/101 353/37 |
| 2014/0240579 A1 | 8/2014 | Park et al. |
| 2014/0267844 A1 | 9/2014 | Iwata et al. |
| 2015/0029595 A1 | 1/2015 | Swihart et al. |
| 2015/0241713 A1 | 8/2015 | Laroia et al. |
| 2015/0244927 A1 | 8/2015 | Laroia et al. |
| 2015/0244949 A1 | 8/2015 | Laroia et al. |
| 2015/0296149 A1 | 10/2015 | Laroia |
| 2016/0004144 A1 | 1/2016 | Laroia et al. |
| 2016/0014314 A1 | 1/2016 | Laroia et al. |
| 2016/0091861 A1 | 3/2016 | Liu et al. |
| 2016/0112637 A1 | 4/2016 | Laroia et al. |
| 2016/0112650 A1 | 4/2016 | Laroia et al. |
| 2016/0182777 A1 | 6/2016 | Laroia et al. |
| 2016/0306168 A1 | 10/2016 | Singh et al. |
| 2016/0309095 A1 | 10/2016 | Laroia et al. |
| 2016/0309110 A1 | 10/2016 | Laroia et al. |
| 2016/0309133 A1 | 10/2016 | Laroia et al. |
| 2016/0316117 A1 | 10/2016 | Singh et al. |
| 2016/0360109 A1 | 12/2016 | Laroia et al. |
| 2016/0381301 A1 | 12/2016 | Shroff |
| 2017/0031138 A1 | 2/2017 | Laroia |
| 2017/0041528 A1 | 2/2017 | Lai et al. |
| 2017/0054919 A1 | 2/2017 | Laroia |
| 2017/0059857 A1 | 3/2017 | Laroia et al. |
| 2017/0070683 A1 | 3/2017 | Laroia |
| 2017/0099439 A1 | 4/2017 | Pulli et al. |
| 2017/0123189 A1 | 5/2017 | Laroia |
| 2017/0126976 A1 | 5/2017 | Laroia |
| 2017/0180615 A1 | 6/2017 | Lautenbach |
| 2017/0180637 A1 | 6/2017 | Lautenbach et al. |
| 2017/0201699 A1 | 7/2017 | Laroia |
| 2017/0208230 A1 | 7/2017 | Laroia |
| 2017/0208257 A1 | 7/2017 | Laroia |
| 2017/0223286 A1 | 8/2017 | Laroia et al. |
| 2017/0280135 A1 | 9/2017 | Shroff et al. |

* cited by examiner

METHODS AND APPARATUS FOR MAINTAINING AND ACCURATELY DETERMINING THE POSITION OF A MOVEABLE ELEMENT

FIELD

The present application relates to methods and apparatus for maintaining, adjusting and/or accurately determining the position of a moveable element, e.g., a moveable shaft mounted element such as a mirror support of a camera module.

BACKGROUND

Hall sensors are often used to measure distance and/or changes in position in applications requiring a high degree of precision with regard to the measurements.

While hall sensors can be used to make measurements to a high degree of precision, the mechanical relationship between elements may allow for a certain amount of what is referred to as free play between elements in the system. In many cases, especially where components are left relatively loose to minimize friction and thus the amount of force required to move an object, the accuracy of measurement made possible by use of a hall sensor may be greater than the reliability of the mechanical system to maintain a consistent position, e.g., relative to a sidewall of a mount.

In compact systems such as cameras there is often a desire to keep components small, light and/or low power for a variety of reasons. For this reason, it is desirable to use small compact motors or drive devices to move components given the size and low power consumption advantages of such devices. To allow a small motor or drive device to move a mirror or other device it is often desirable to have little friction at the location of a hinge or moveable shaft used to mount the mirror or other component. To have low friction a loose fit may be used between the shaft and the support in which the shaft is mounted.

In the case of camera components high accuracy is required in terms of detecting and/or controlling the position of a moveable component such as a mirror.

In the case of mirrors supported using loose shafts, rather than simply rotate in a desired direction, there may be a side to side movement as the shaft mounted component and/or shaft slide side to side in a mount as the supported component is moved, e.g., rotated, about the shaft axis. In the case where a distance sensor is used to measure a distance to the mirror from which the angle of the mirror is determined, such side to side motion, although slight, can introduce minor errors into the estimate of the mirror position relative to a fixed sensor. This can cause a loss in accuracy in determining the angle of the mirror from such a distance measurement.

In some camera systems the side to side motion of a mounted mirror can introduce an error in the estimate of the angle of the mirror by one or two percent or some other amount. Such an error can have a significant impact on the control of the mirror position making it difficult to control the position of the mirror to as high a degree of accuracy as might be desirable in at least some camera applications.

While mirror position measurement and control is one example in which a hall sensor is used, and side to side motion may introduce errors, similar problems may and will occur in other applications where a hall sensor is used and undesired side to side motion of an object to which a distance is being measured may occur, e.g., due to an intentionally loose shaft or other mounting component.

In view of the above, it should be appreciated that there is a need for improved methods and/or apparatus which would allow for accurate measuring, maintaining and/or adjusting of a position of a moveable mounted component, e.g., a shaft mounted component, while still allowing for a relatively low friction mounting arrangement.

SUMMARY

Methods and apparatus for maintaining, adjusting and/or accurately determining the position of a moveable element, e.g., a moveable shaft mounted element such as a mirror support of a camera module are described.

In at least some embodiments a hall sensor is used to measure distance to a moveable component, e.g., mirror support on which a mirror is mounted. To facilitate the distance measurement one or more magnets are secured to the moveable component. The hall sensor is used to measure the distance between the magnet or magnets and the sensor and/or to detect changes in the distance between the magnet or magnets and the hall sensor.

In some embodiments the moveable component, e.g., mirror support to which a mirror is secured, is mounted on a shaft and allowed to rotate around the axis of the shaft which may be, and sometimes is, supported between first and second support walls into which the shaft is inserted. The shaft may be a single straight shaft where each end acts as a pin inserted each of the support walls or in other embodiments is integrated into, e.g., molded as part of, the moveable component with pins which form the shaft extending out from opposite sides of the moveable component.

In accordance with various features of the invention, in some embodiments a metal plate is placed along one of the supports used to support a shaft to which the moveable component is secured or integrated into as part of the moveable component.

The magnet or magnets used to facilitate distance measurements, which in some cases can and are translated into an estimate of the angular position of the moveable component, are used in some embodiments to help maintain the position of the moveable component to a side of a support in which the component is mounted. In some embodiments a metal plate, e.g., of a magnetic metal, is placed on the side of the support in which the moveable component is mounted. The hall sensor may be, and sometimes is, mounted at a fixed position relative to a support which supports one side of the moveable component. The sensor may be, and in some embodiments is, inserted through an opening in the support wall. In other embodiments the hall sensor is mounted on the support wall at a fixed location. The magnet which is detected by the hall sensor is attracted towards the plate thus pulling the moveable component on the shaft towards the sidewall. The pull of the magnet towards the magnetic metal plate helps avoid the shaft shifting left to right as it is rotated. Thus the use of the magnetic metal plate helps increase measurement accuracy by reducing shaft side to side motion without the need for a tight fitting shaft which might increase friction and require the use of a larger motor.

In some embodiments the hall sensor, also sometimes referred to as a halifax sensor, is mounted on a flexible circuit board, often called a flex tape, with the sensor extending through an opening in one of the side supports which supports a pin of a shaft on which the moveable object is mounted. The flex tape can be sandwiched between the magnetic metal plate and the side of the support and used to communicate sensor signals from the sensor mounted on the flex tape to a processor which computes the position of the moveable object, e.g., mirror support cradle, and thus angle at which the mirror is positioned relative to the bottom of the mirror support or another fixed component.

The methods and apparatus are well suited for use in mirror modules where mirrors are to be mounted in a manner which allows them to be rotated, e.g., moved in terms of their angle, and where it is desirable to use small and components and where it is also desirable to use little power to move components. However, the methods and apparatus are not limited to camera modules and may be used in a wide range of devices where one or more hall sensors are used.

In some embodiments, one or more camera modules include a moveable mirror mounted in accordance with the invention and whose position is determined using a hall sensor in accordance with the invention. A single camera may, and often does include multiple mirror modules implemented in accordance with the invention.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
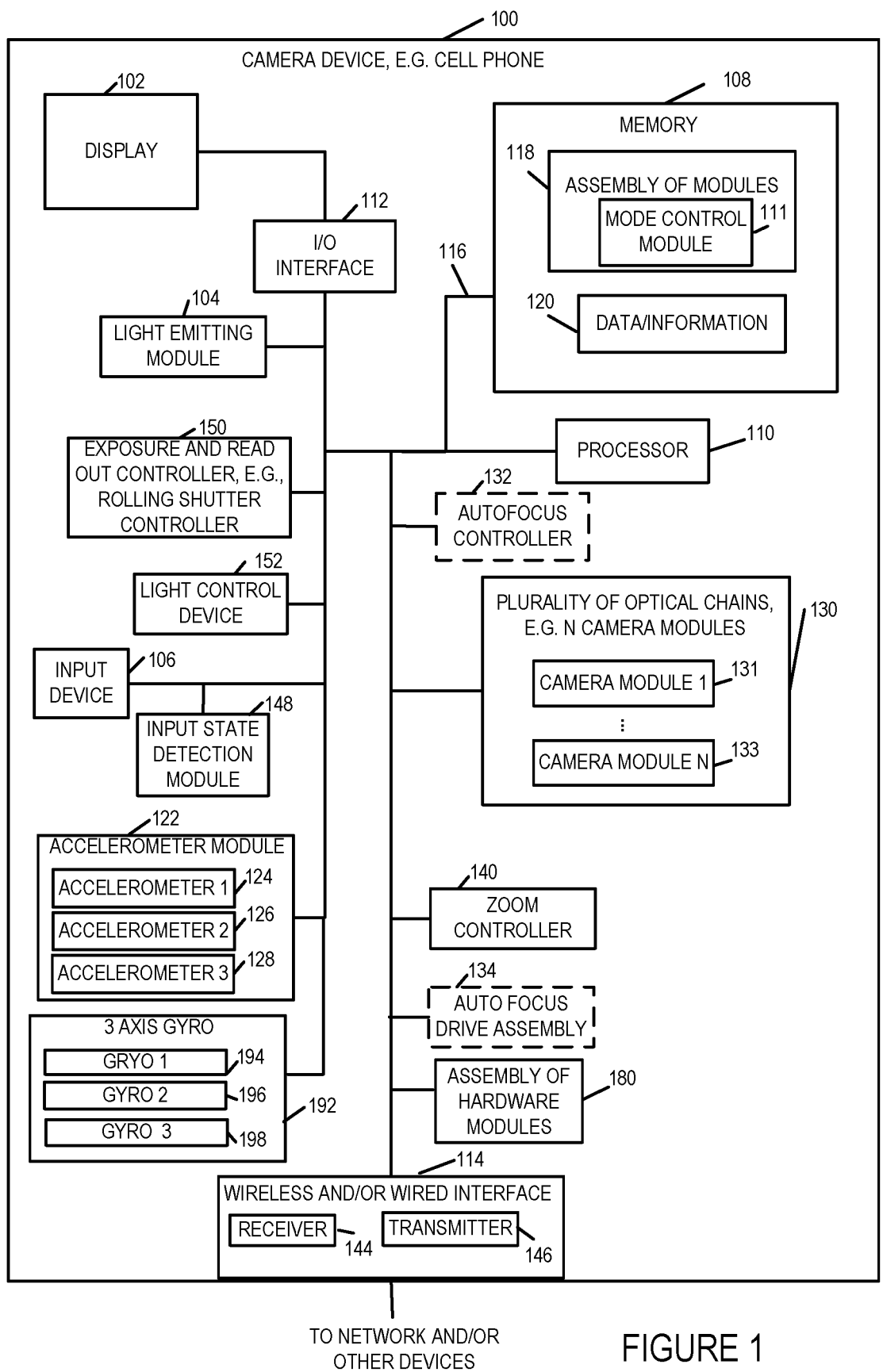
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 7A while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed as will be discussed below with regard to FIGS. 5 and 34 depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
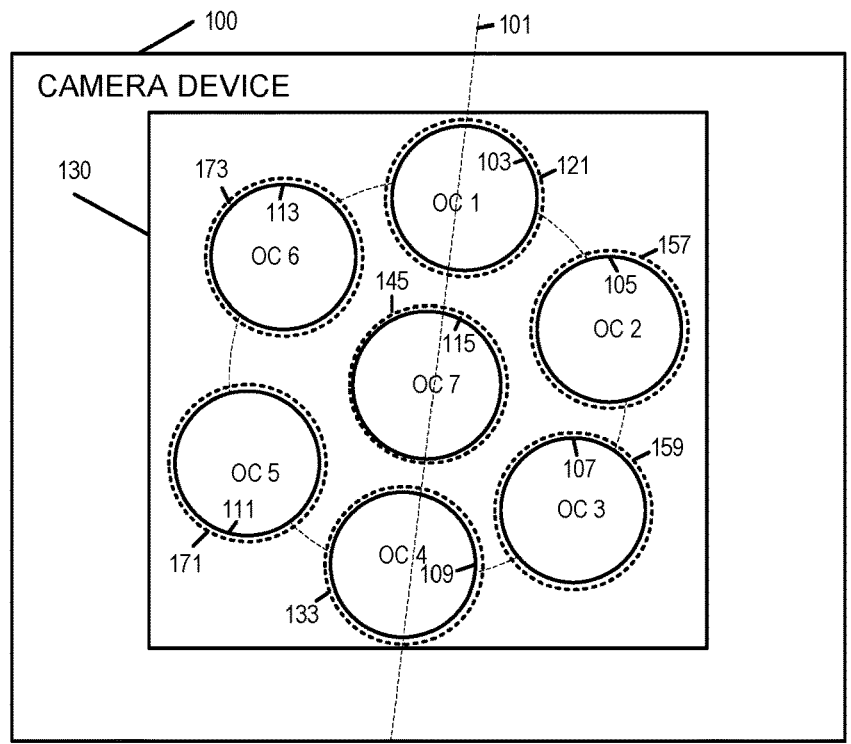
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

Figure 3:
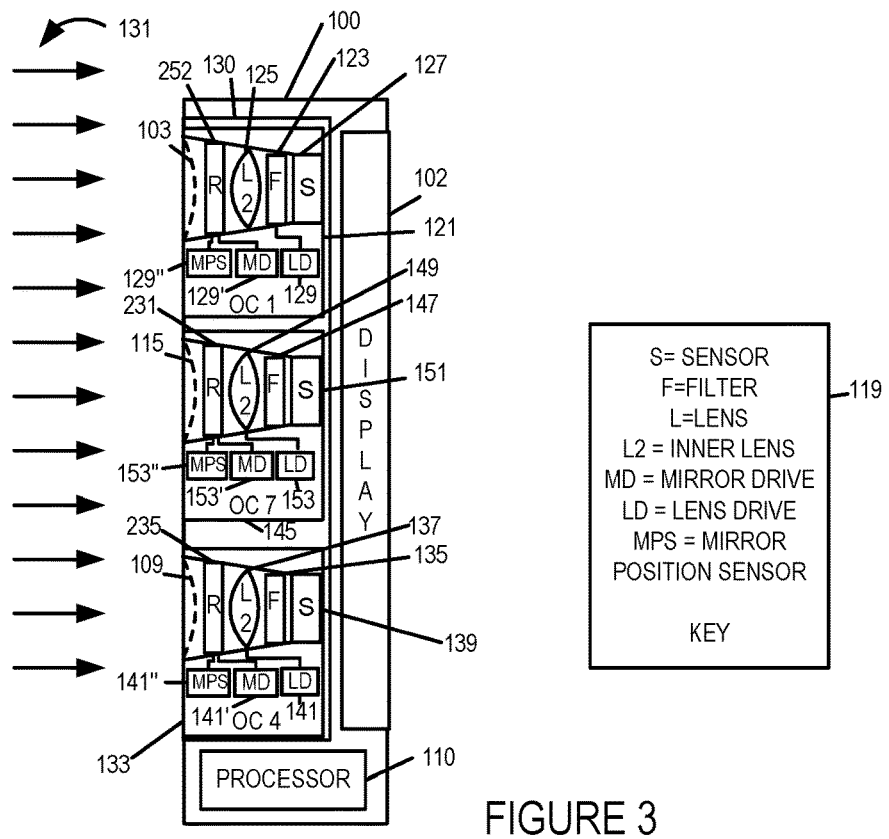
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, a light redirection element 252, e.g., a mirror, an inner lens L2 125, a filter 123 and a sensor 127. In some embodiments the OC 1 121 further includes lens drive (LD) 129 for controlling the position of lens L2 125 for zooming and/or auto focus operation purposes, a mirror drive (MD) 129' for controlling the positioning of the light reflection element 252 as desired to deflect light, and a mirror position sensor 129" for sensing, e.g., detecting and/or measuring, the position of the light reflection element 252. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. The MD includes a motor or other drive mechanism which can control the relative angle of reflection element 252 allowing for alteration of angle of redirection of incident light.

OC 7 145 includes an outer opening 115, a light redirection element 231, an inner lens L2 149, a filter 147, and a sensor 151. OC 7 145 further includes LD 153 for controlling the position of lens L2 149, a and a mirror drive (MD) 153' for controlling the positioning of the light reflection element 231, and a mirror position sensor 153" for sensing, e.g., detecting and/or measuring, the position of the light reflection element 231. The LD 153 includes a motor or other drive mechanism which can move the lens, barrel, cylinder, sensor or other optical chain element to which it is connected.

OC 4 133 includes an outer opening 109, a light redirection element 235, an inner lens L2 137, a filter 135 and a sensor 139. OC 4 133 includes LD 141 for controlling the position of lens L2 137 and MD 141' for controlling the positioning of the light reflection element 235, and a mirror position sensor 141" for sensing, e.g., detecting and/or measuring, the position of the light reflection element 235.

The LD 153, 141 and MD 153', 141' include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 shows optical chains, e.g., camera modules, which include light redirection devices. Such modules can be used alone or in combination with other modules such as the ones shown in FIGS. 3 and 4A or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. In some embodiments one or more light redirection elements, e.g., mirrors, such as elements 252, 231, 235 shown in FIG. 3, are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7 145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

Figure 6:
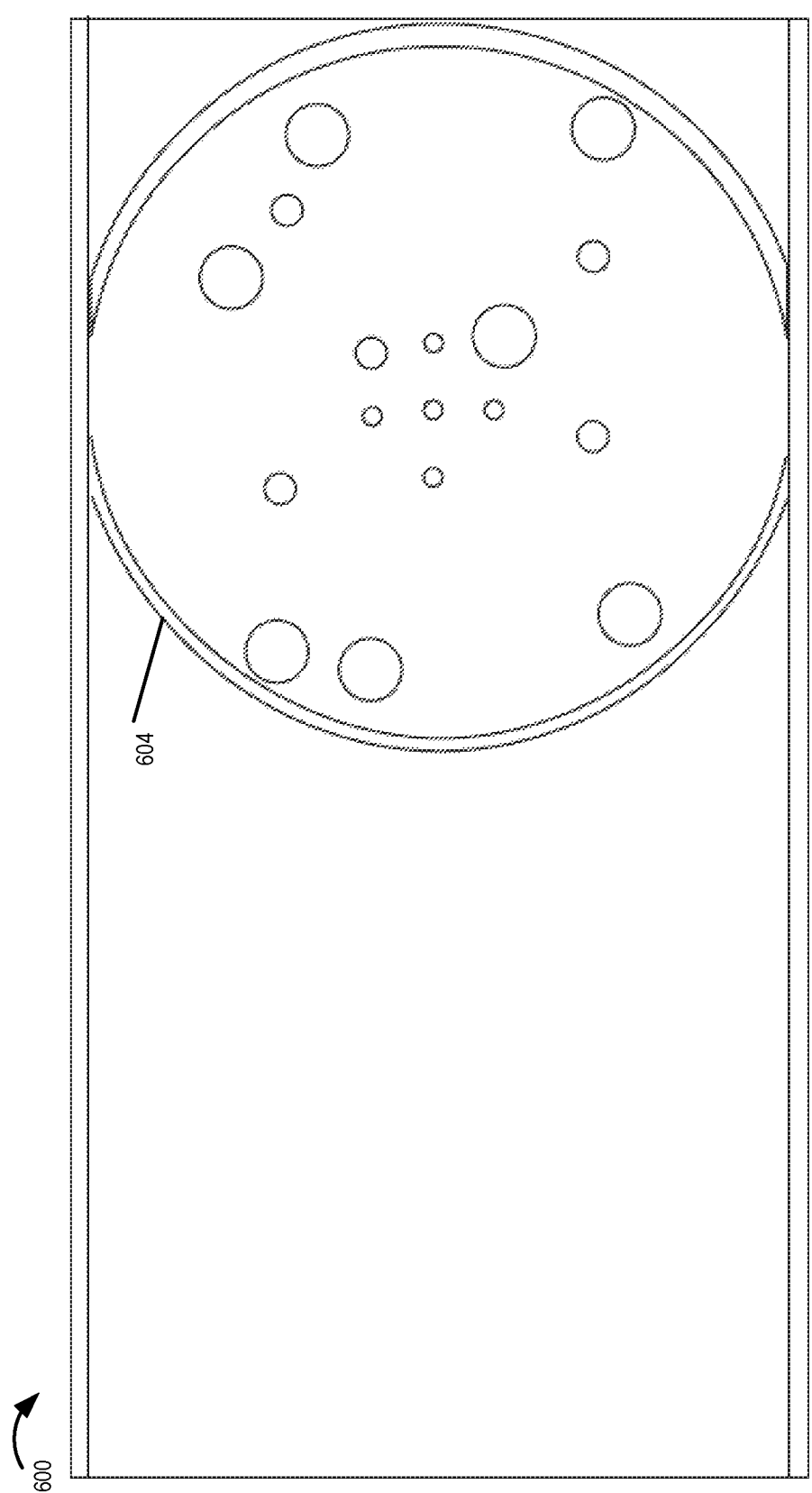
FIG. 6 is an illustration of an exemplary camera including multiple optical chains in accordance with one feature of the invention showing the arrangement of the lenses of individual camera modules'

While seven optical chains are shown in FIG. 2, it should be appreciated that other numbers of optical chains are possible. For example, as shown in FIG. 6 seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a light redirection element such as a mirror or prism, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

Note that while supporting a relatively large light capture area and offering a large amount of flexibility in terms of color filtering and exposure time, the camera device 100 shown in FIG. 3 is relatively thin with a thickness that is much less, e.g., ⅕th, 1/10th, 1/20th or even less than the overall side to side length or even top to bottom length of the camera device visible in FIG. 2.

Figure 4A:
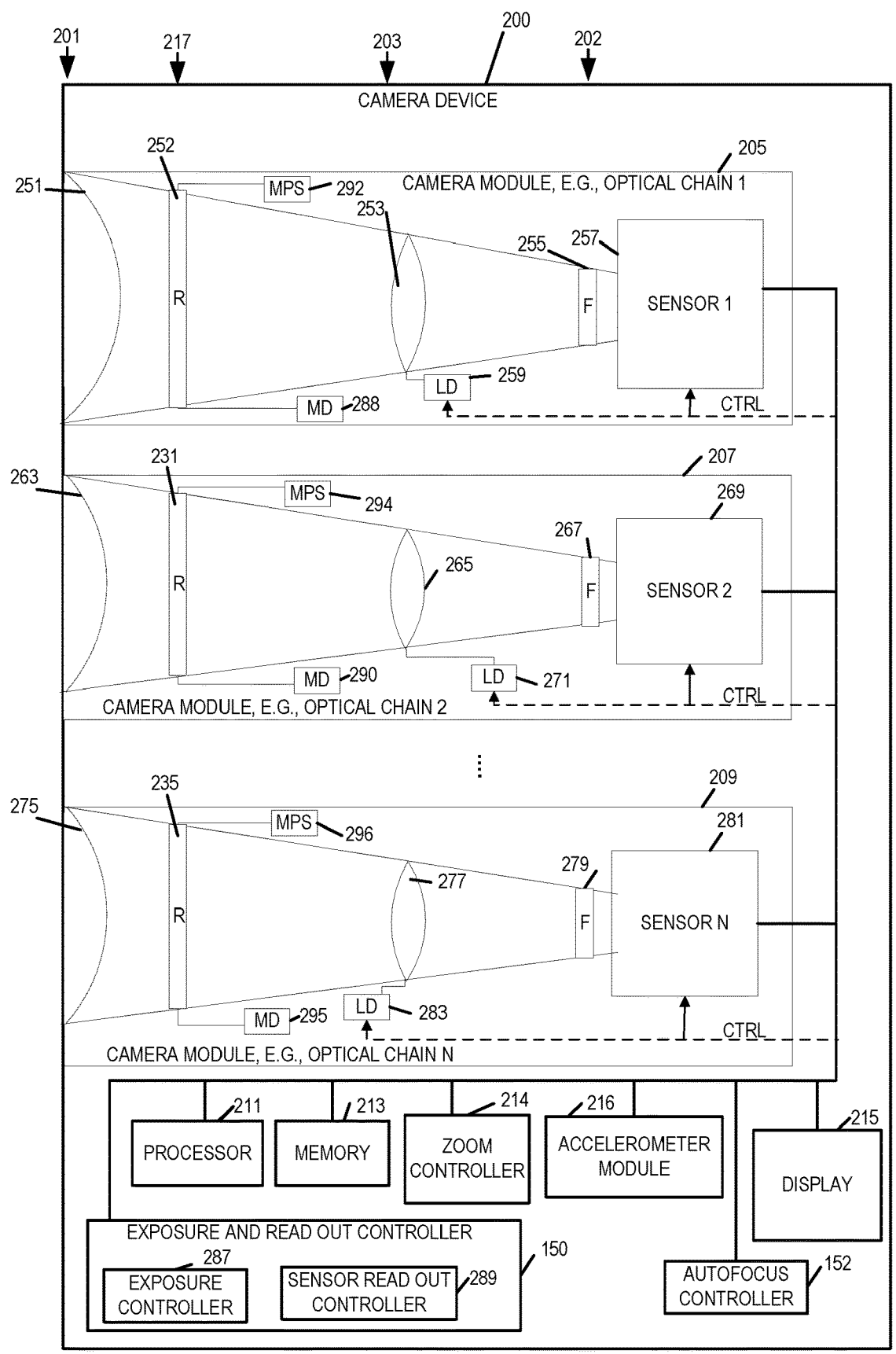
FIG. 4A illustrates a camera device implemented in accordance with another embodiment.

FIG. 4A illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC X 209), a processor 211, memory 213 and a display 215, coupled together. OC 1 205 includes outer opening 251, a light redirection element R 252, a hinge (or mirror) drive MD 288, a mirror position sensor 292, an inner lens L2 253, a filter 255, sensor 1 257, and LD 259. Mirror position sensor 292 senses, e.g., detects and/or measures, the position of the light redirection element R 252, e.g., a mirror. The MD 288 can be used to move a position of a hinge to which the light redirection device (R) 252, e.g., mirror, is mounted and thus move the mirror to change the scene area to which the module 205 is directed without moving the optical chain 205. Moving (e.g., rotating about a hinge) the mirror 252 to change the scene area to which the module 205 is directed is especially useful in an embodiment where the outer opening 251 is a plane piece of glass or a plastic piece with no optical power as is the case in some embodiments.

Figure 4B:
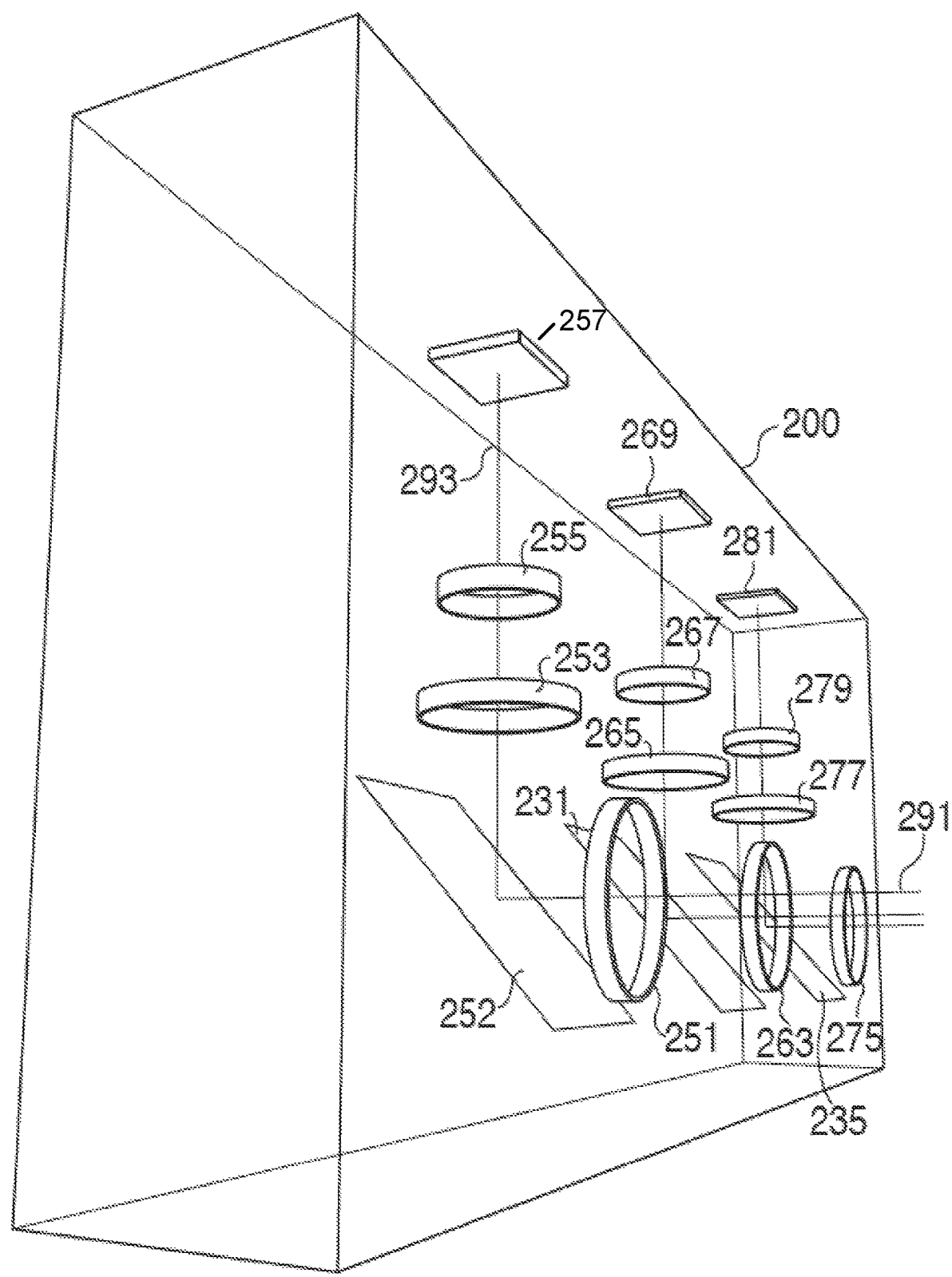
FIG. 4B illustrates the optical chains of the camera device shown in FIG. 4A, as implemented in one particular exemplary embodiment, in greater detail.
Figure 5:
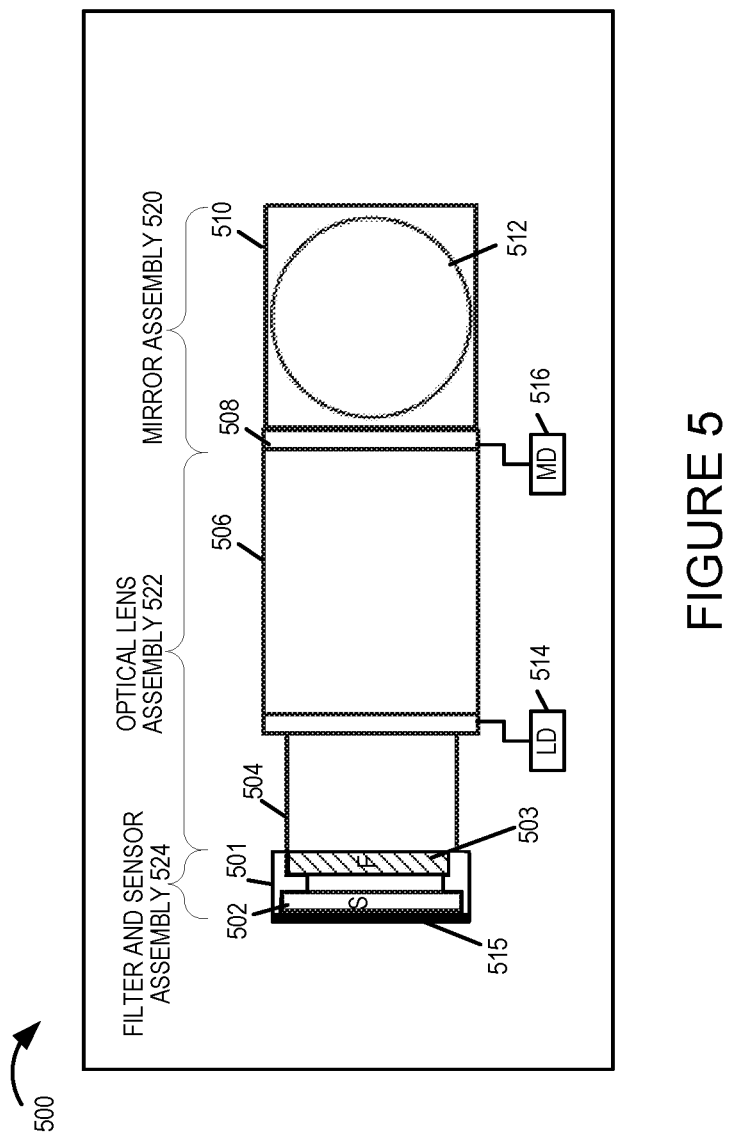
FIG. 5 illustrates an exemplary optical chain, e.g., camera module, which may be used as one of the optical chains included in the camera device of FIG. 1 or any other embodiments.

The optical chains shown in FIG. 4A can be arranged in various positions within the camera 200. The elements in FIG. 4B which are the same as those shown in FIG. 4A are identified using the same references numbers and will not be described again. FIG. 4B shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 4B embodiment, light entering in the horizontal dimension is redirected upward in the vertical. For example, light entering through outer opening 251 of the first optical chain 205 is redirected upward by mirror 252 so that it passes though the inner lens 253 and the filter 255 as it travels towards sensor 257. An optical chain such as the first optical chain 205, that has a light redirection element, such as the element 252, can be divided, for purposes of discussion, into two parts, Part A and Part B. Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 253 are included in Part B of the optical chain which have an optical power. Thus, it should be appreciated that in at least some embodiments the outer opening 251 may be implemented as a flat glass plate or relatively flat plastic or glass element which does not protrude from the surface of the camera 200. This reduces the risk of scratches and also reduces the possibly that an outer portion which is covering or forming the opening will get caught when inserting or removing it from a pocket or case as might be the case if the opening is covered by a curved lens protruding from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4A is the same as or similar to processor 110 of device 100 of FIG. 1, memory 213 of device 200 of FIG. 4A is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4A is the same as or similar to the display 102 of device 100 of FIG. 1.

OC 2 207 includes outer opening 263, light redirection device 231, mirror drive 290, mirror position sensor 294, inner lens 265, filter 267, sensor 2 269, and LD 271. OC N 209 includes outer opening 275, light redirection device 235, mirror drive 295, mirror position sensor 296, inner lens 277, filter 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4A embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4A, the structural relationship between the mirror and various lenses and filters which precede the sensor in each optical chain can be seen more clearly than in some of the other figures. While four elements, e.g. an opening, lens (see columns 201 and 203), a light redirection device R (see col. 217), and the filter (corresponding to column 202) are shown in FIG. 4A before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 5 shows an optical chain, e.g., camera module, 500 which is used in various exemplary embodiments. A plurality of optical chains of the type illustrated in FIG. 5 are used in a camera device such as camera 600 discussed in detail below. The camera module 500 is an optical chain that includes an assembly of different elements integrated together to form the camera module. As illustrated, camera module 500 includes a mirror assembly 520, an optical lens assembly 522 and a filter and sensor assembly 524. The mirror assembly 520 of the camera module 500 includes an outer opening 512 which maybe covered by a flat glass/plastic plate, a light redirection device, e.g., mirror, 510 positioned behind the opening 512, and a mirror hinge 508. The mirror hinge 508 is coupled to the mirror drive (MD) 516. The optical elements assembly 522 of the camera module 500 includes a first cylindrical module portion 506 and a second cylindrical module portion 504, with the optical elements assembly 522 being coupled to a lens drive 514. The filter and sensor assembly 524 of the camera module 500 includes a filter mounted on a filter mount 501 and a sensor 502 placed on a mounting board 515. Light enters the optical chain 500 via the opening 512 and is redirected by the mirror 510 so that it reaches the sensor 502 at the back of the optical chain. The first and second cylindrical portions 504, 506 can house one or more lenses and in some cases filters as well as other optical components through which light may pass before reaching the sensor 502. While the mirror 510 is normally used to redirect light 90 degrees so that light entering through the opening 512 (which may be positioned on the face of the camera) along it's optical axis will be redirected along the optical axis of Part B of the optical chain 500 so that is travels towards the side of the camera allowing for the optical chain 500 to effectively use the side to side distance of the camera device in which the optical chain 500 is mounted, the mirror drive 516 may move the position of the hinge 508 and thus the mirror 510 to alter the angle of redirection so that it varies from 90 degrees. Thus, the direction in which the optical chain 500 effectively points may be altered by moving all or a portion of the hinge 508 and mirror 510. In some embodiments, the axis of the hinge is perpendicular to the Part B of the optical axis and parallel to the place of the front face of the camera 600. In some embodiments, the opening 512 is covered with a plane glass with no optical power.

The MD 516 may be implemented using a motor or other mechanical mechanisms which can be used to drive or change the position of the mirror 510 and/or hinge 508 which connects the mirror to the other components of the camera module such as cylindrical portion 506.

The cylindrical or barrel portions 504, 506 of the optical elements assembly 522 may be moved by lens drive 514 so that they slide relative to each other, e.g., barrel portion 504 may be moved so that it moves further into or out of the barrel portion 506 thereby altering the distance from the opening 512 to the sensor 502 as part of a focus or zoom operation.

It should be appreciated that the optical chain 500 allows for relatively long optical chains to be positioned in a camera device which has a depth which is less than the overall length of the optical chain 500. The camera module 500 is particular well suited for implementing camera devices which include multiple optical chains but which are still intended to be relatively thin to facilitate storage in a pocket or other storage device.

FIG. 6 is a frontal view of the camera device 600 and the optical chain arrangement of the camera device with the 15 outer openings being clearly visible as circles in the lens area 604. Note that the diameter of the smallest lenses is "d" which corresponds to the camera modules having the smallest focal length, the medium focal length modules have a diameter 2d, and the camera modules having the largest focal length have a diameter 4d. This results in the camera modules having the same 'f stop' or 'f number' given the focal length relationship f1 being ¼ the largest focal length (f3) and one half the focal length of the medium focal length f2 of the camera modules having a medium focal length. The 'f number' is the ratio of the focal length to the aperture diameter and determines the diffraction limit of the camera modules. The smaller the f number, the less likely it is that the camera module will be diffraction limited. Smaller f numbers usually corresponded to larger optical complexity in the camera module. Small lenses with 5 or 6 molded plastic elements these days can be manufactured in a cost effective manner for f numbers around 2.4. Accordingly, in some embodiments plastic lenses made of multiple plastic elements are used.

Figure 7:
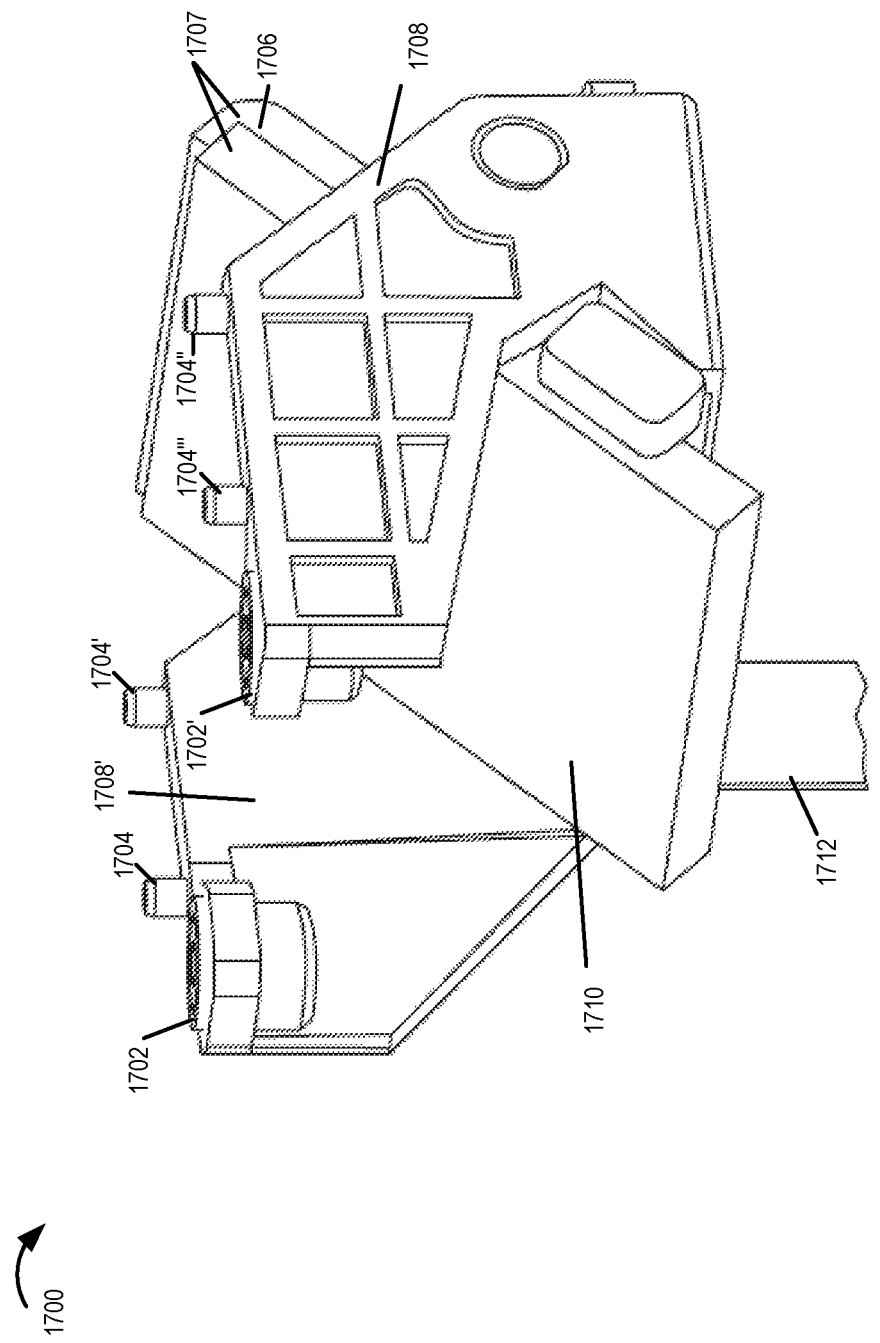
FIG. 7 illustrates a movable mirror assembly and mirror supports included in an exemplary 150 mm camera module.
Figure 17:
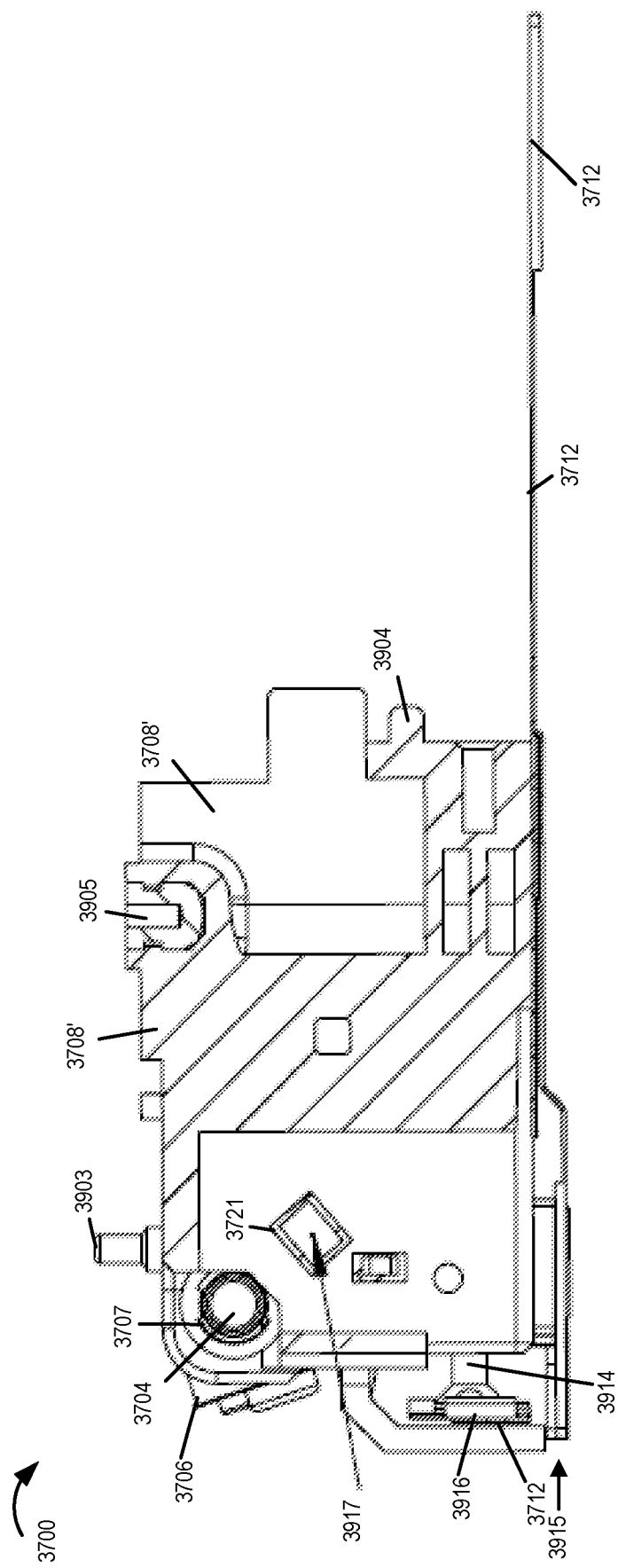

FIG. 7 is a drawing 1700 illustrating a movable mirror assembly 1707 for a 150 mm camera module, mirror supports (first mirror side support 1708, second mirror side support 1708'), and a flexible printed circuit board/tape 1712 for mirror position control. The movable mirror assembly 1707 includes a mirror 1707 and a mirror support cradle 1706. The mirror 1710 is mounted in the mirror cradle support 1706. First side support 1708 includes locator pins (1704", 1704'"). Second side support 1708' includes locator pints (1704, 1704'). First side support 1708 includes threaded mounting screw hole 1702', e.g., with a metal threaded insert. Second side support 1708' includes threaded mounting screw hole 1702, e.g., with a metal threaded insert. In FIG. 17, the movable mirror assembly 1707 is shown within the side supports (1708, 1708').

Figure 8:
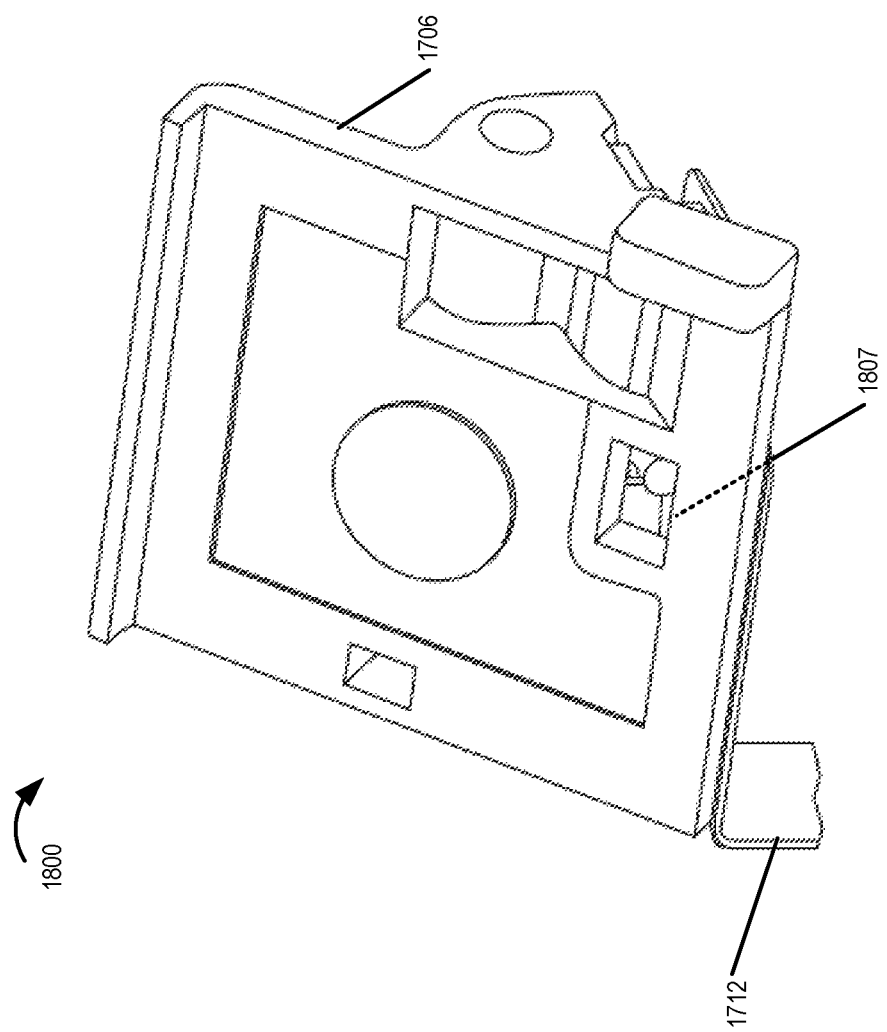
FIG. 8 illustrates a mirror cradle support included in an exemplary 150 mm camera module.

FIG. 8 is a drawing 1800 illustrating the mirror support cradle 1706 and the flexible printed circuit board/tape 1712 for mirror position control. Drawing 1800 also identifies a first portion 1807 of the mirror assembly 1707.

Figure 9:
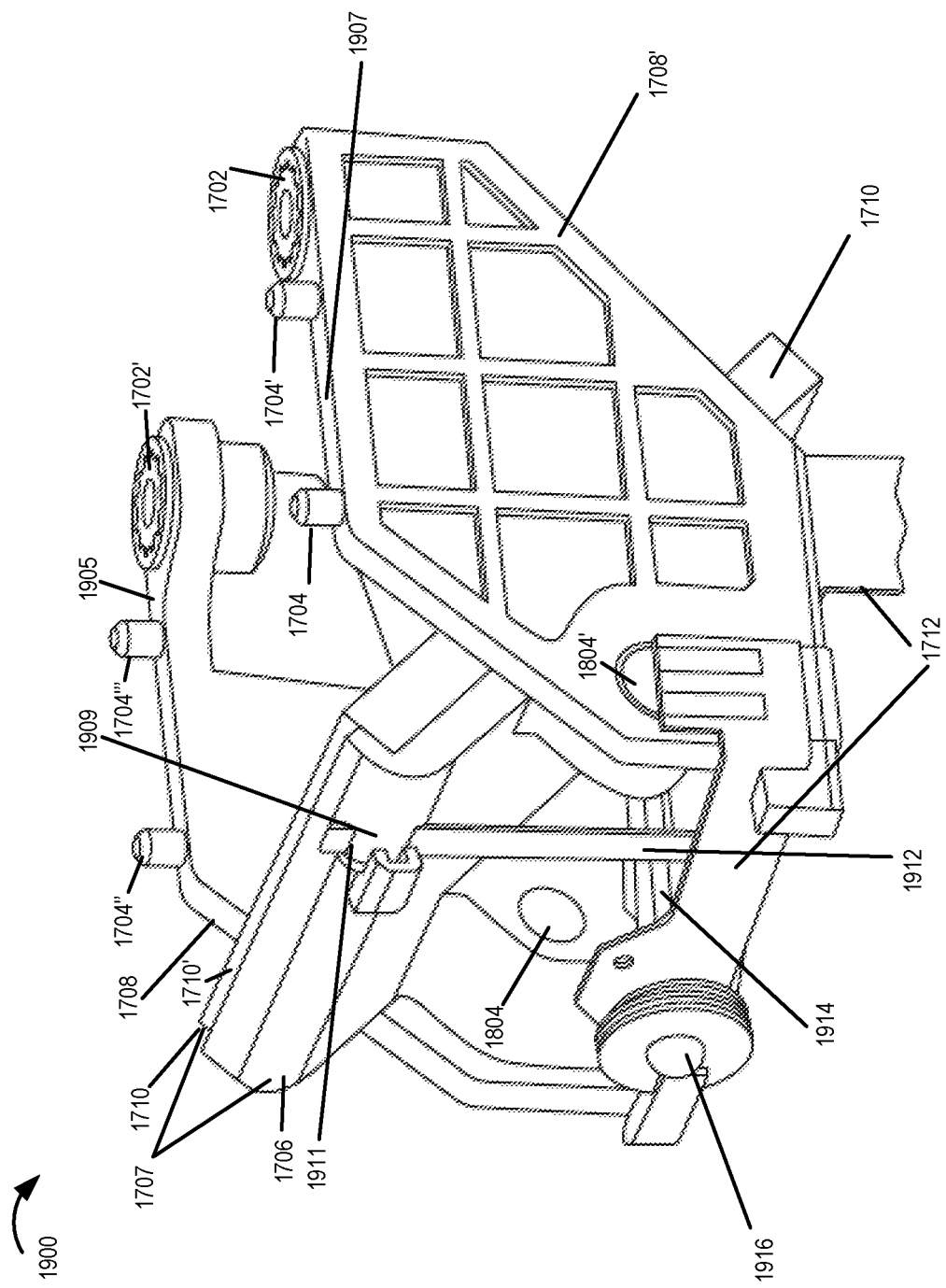
FIG. 9 illustrates a view of a movable mirror portion an exemplary 150 mm camera module and identifies components, features and/or aspects of the movable mirror portion.

FIG. 9 is drawing 1900 illustrating the movable mirror assembly 1707 for a 150 mm camera module, mirror supports (first side support 1708, second side support 1708'), a mirror return spring 1912, a piezo electric actuator 1916, a mirror drive rod 1914, flexible printed circuit board/tape 1712 for mirror position control, and mirror pivot rods (1804, 1804'). The moveable mirror assembly 1707 includes mirror 1710 mounted in mirror support cradle 1706. The moveable mirror assembly 1707 is shown within the side supports (1708, 1708').

Drawing 1900 further illustrates that the top 1905 of the first mirror support 1708 includes locator pins (1704", 1704'") and threaded mounting screw hole 1702', e.g., with a metal threaded insert. Drawing 1900 further illustrates that the top 1907 of the second mirror support 1708' includes locator pins (1704, 1704') and threaded mounting screw hole 1702, e.g., with a metal threaded insert.

The piezoelectric actuator 1916, which is a linear actuator, exerts a linear force on the first portion 1807 of the mirror assembly 1707, to control rotation of the mirror assembly 1707. The mirror pivot rods (1804, 1804'), which are pivots, are attached to the mirror assembly 1707 and inserted into the mirror supports (1708, 1708'), respectively, allowing the mirror assembly 1707 to rotate with respect to the mirror supports (1708, 1708'). The mirror drive rod 1914 is for transferring linear force generated by the linear actuator 1916 onto said first portion 1807 of the mirror assembly 1707. In some embodiments, the mirror drive rod 1914 makes contact with the first portion 1807 of the mirror assembly 1707 and presses against the first portion 1807 of said mirror assembly 1707 but is not attached to the first mirror assembly 1707.

The mirror return spring 1912 is a flat piece of spring metal inserted into a spring retaining slot 1911 in a second portion 1909 of the mirror assembly 1707. The first portion 1807 of the mirror assembly 1707 is a lower portion on the mirror assembly than the second portion 1909 of the mirror assembly 1707, and the second portion 1909 of the mirror assembly 1707 is an upper portion of the mirror assembly 1707. The mirror return spring 1912 exerts a force contrary to the force of the actuator 1912.

In this example, the actuator 1916, via the drive rod 1914, pushes the bottom of the mirror assembly 1707 including mirror 1710. In other embodiments, the controlled movement of the mirror is done differently, e.g., the force is applied at a different location.

The top 1710' of the mirror 1710 can, and sometimes does, extend above the top (1905, 1907) of the side supports (1708, 1708').

Figure 10:
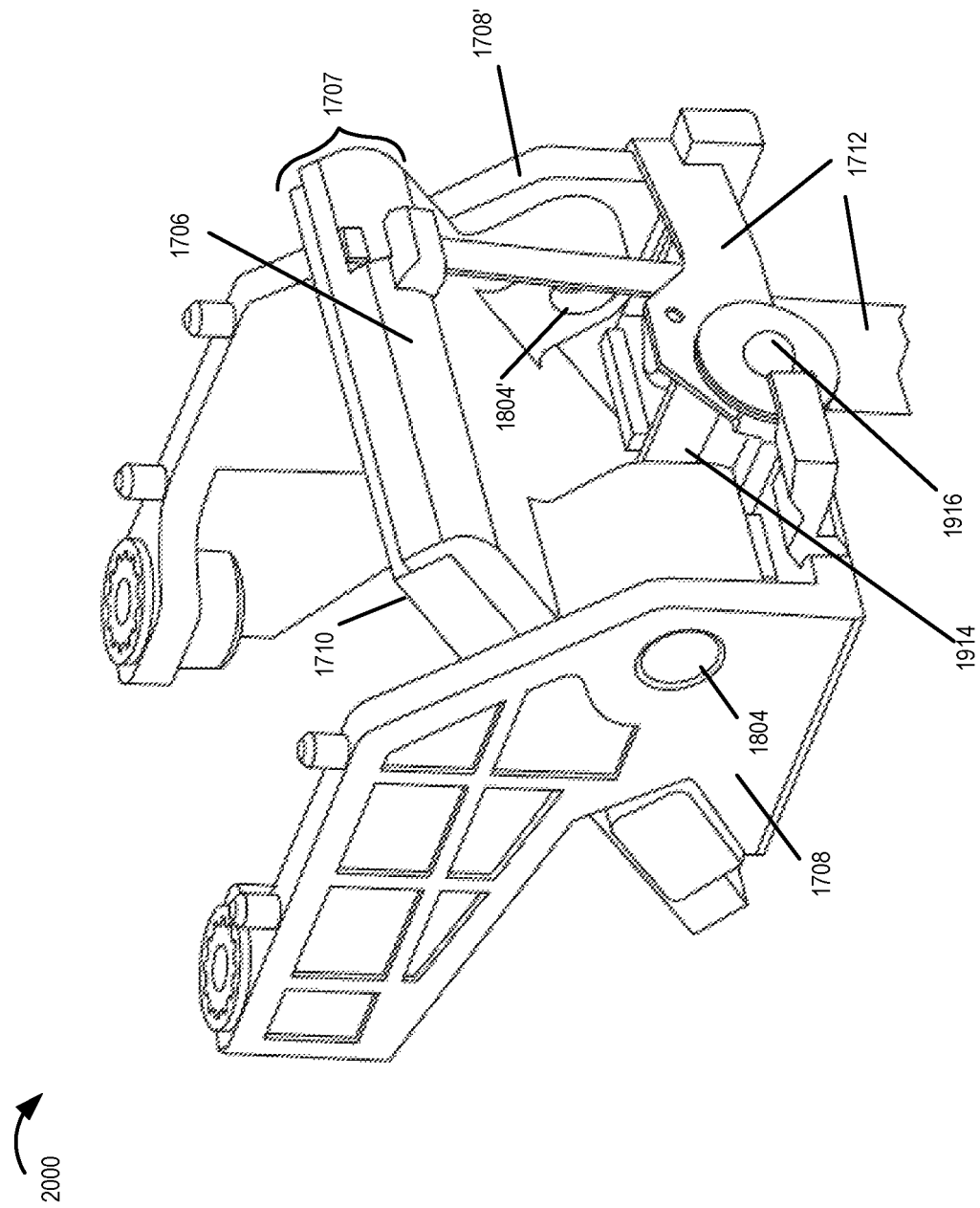
FIG. 10 illustrates another view of the movable mirror portion of an exemplary 150 mm camera module and identifies additional components, features and/or aspects of the movable mirror portion.

FIG. 10 is a drawing 2000 illustrating another view of the moveable mirror assembly 1707 for a 150 mm camera module, including the mirror cradle 1706 and mirror 1710, within mirror side supports (1708, 1708'). Drawing 2000 further illustrates the pivot pins (1804, 1804'), the piezoelectric linear actuator 1916, the mirror drive rod 1914, and flexible printed circuit board/tape 1712 for mirror position control.

Figure 11:
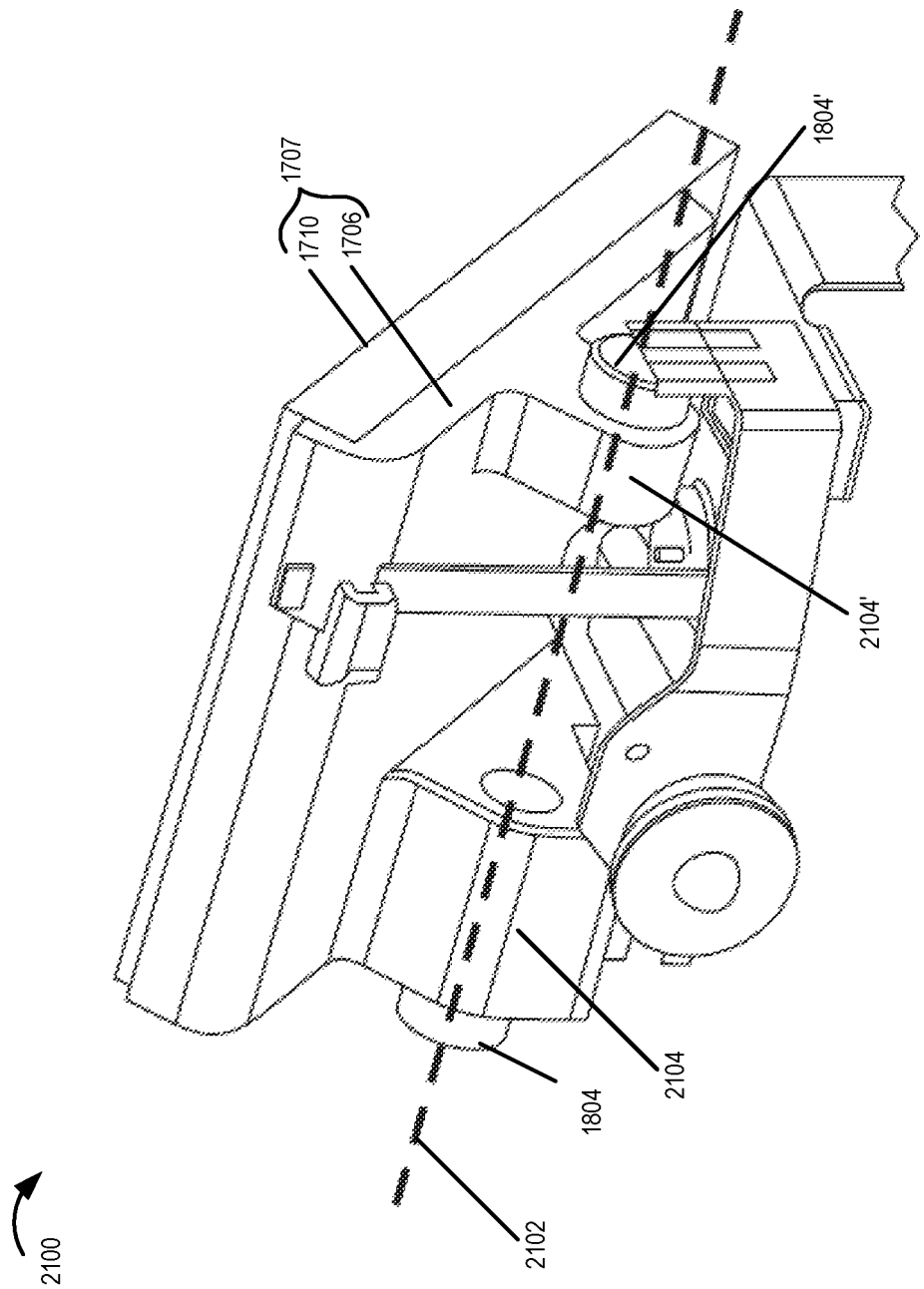
FIG. 11 illustrates another view of the movable mirror portion of an exemplary 150 mm camera module and identifies additional components, features and/or aspects of the movable mirror portion.

FIG. 11 is a drawing 2100 illustrating the moveable mirror assembly 1707 including mirror 1710 within mirror support cradle 1706. Drawing 2100 illustrates mirror pivot axis 2102 which goes through mirror pivots (1804, 1804'). The moveable mirror assembly 1707 rotates about mirror pivot axis 2102. In some embodiments, the mirror pivot hinge formed by mirror pivot shafts (1804, 1804') and pivot shaft support mounts (2104, 2104') on the mirror holder, which is mirror cradle 1706, is not at the center of the mirror 1710. In some embodiments, the mirror 1710 is larger on the upper side of the mirror pivot than below the mirror pivot.

Figure 12:
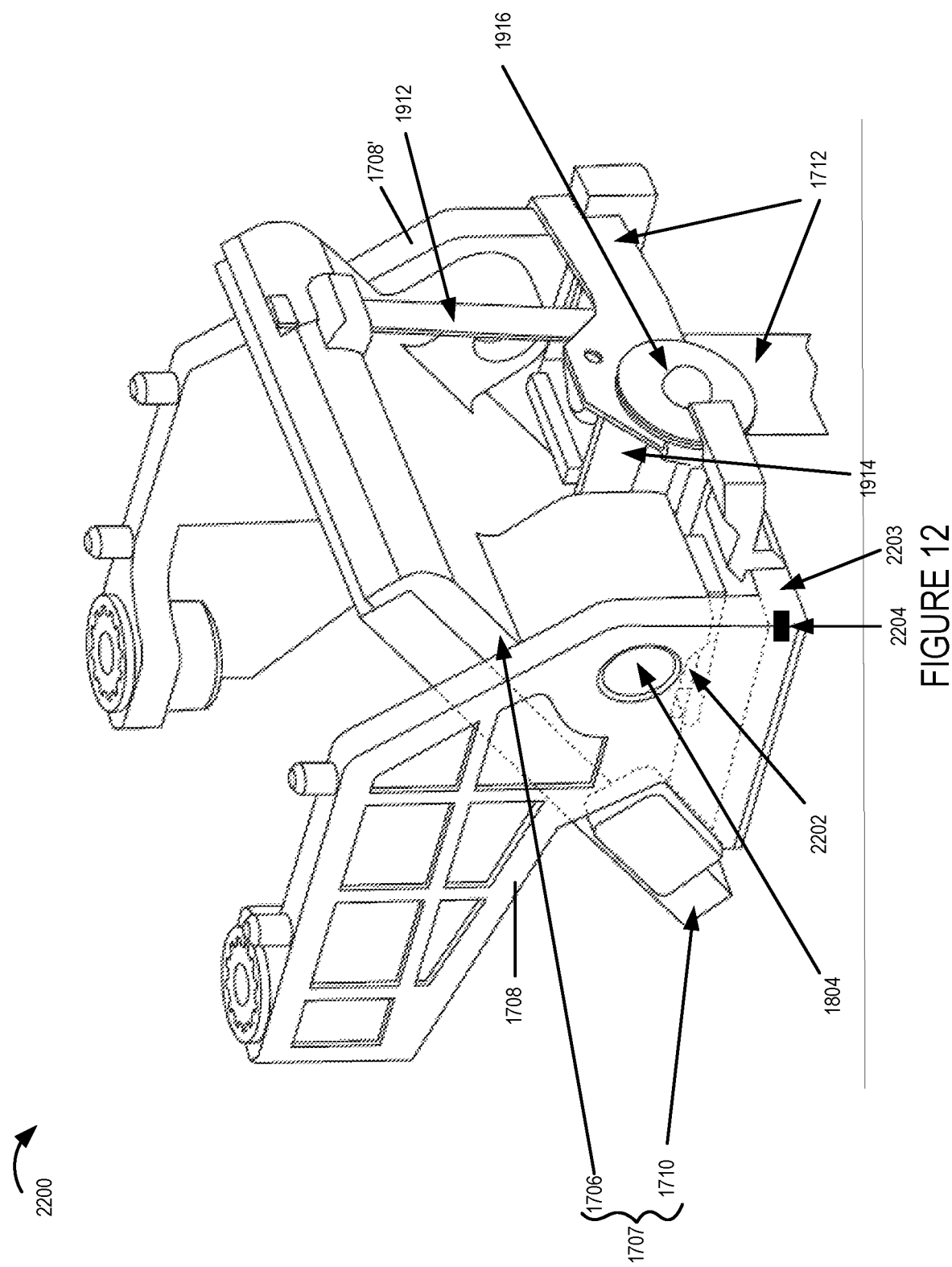
FIG. 12 illustrates another view of the movable mirror portion of an exemplary 150 mm camera module and identifies additional components, features and/or aspects of the movable mirror portion.

FIG. 12 is a drawing 2200 illustrating the movable mirror assembly 1707 including mirror 1710 within support cradle 1706, mirror supports (1708, 1708'), support base 2203, pivot pin 1804, linear actuator 1916, mirror drive rod 1914, spring strip 1912, mirror control FPC 1712, a hall sensor magnet 2202 and a hall sensor position encoder 2204. The mirror drive rod 1914 moves the mirror 1710 as the actuator 1916 moves in/out.

The mirror side supports (1708, 1708') are attached to the support base 2203. The hall sensor 2204 is mounted on or within the support base 2203. The hall sensor magnet 2202 is mounted on or within the mirror support cradle 1706. The hall sensor 2204 detects the position of the magnet 2202 on mirror support cradle 1706 relative to the sensor 2204. In some embodiments, the hall sensor 2204 is a hall sensor position encoder which generates signal based on distance to the hall sensor magnet 2202.

In some embodiments, the hall sensor 2204 detects the position of the magnet 2202 on mirror support cradle 1706 relative to the sensor 2204, and the encoder, e.g., included in sensor 2204, encodes detected position information and communicates the encoded information via an electrical signal to the mirror position controller and/or processor in the camera via the mirror control flexible printed circuit 1712 to allow for detection of mirror position and closed loop position control of the actuator 1916 based on the position feedback from the sensor 2204.

In various embodiments, the encoder is mounted to the FPC (flexible printed circuit) and is stationary. The magnet attached to the bottom holder of the mirror moves when the Tule (actuator) shaft/rod pushes the mirror at the lower edge. The encoder gives the linear displacement number due to magnet motion which is converted to angular displacement.

Figure 13:
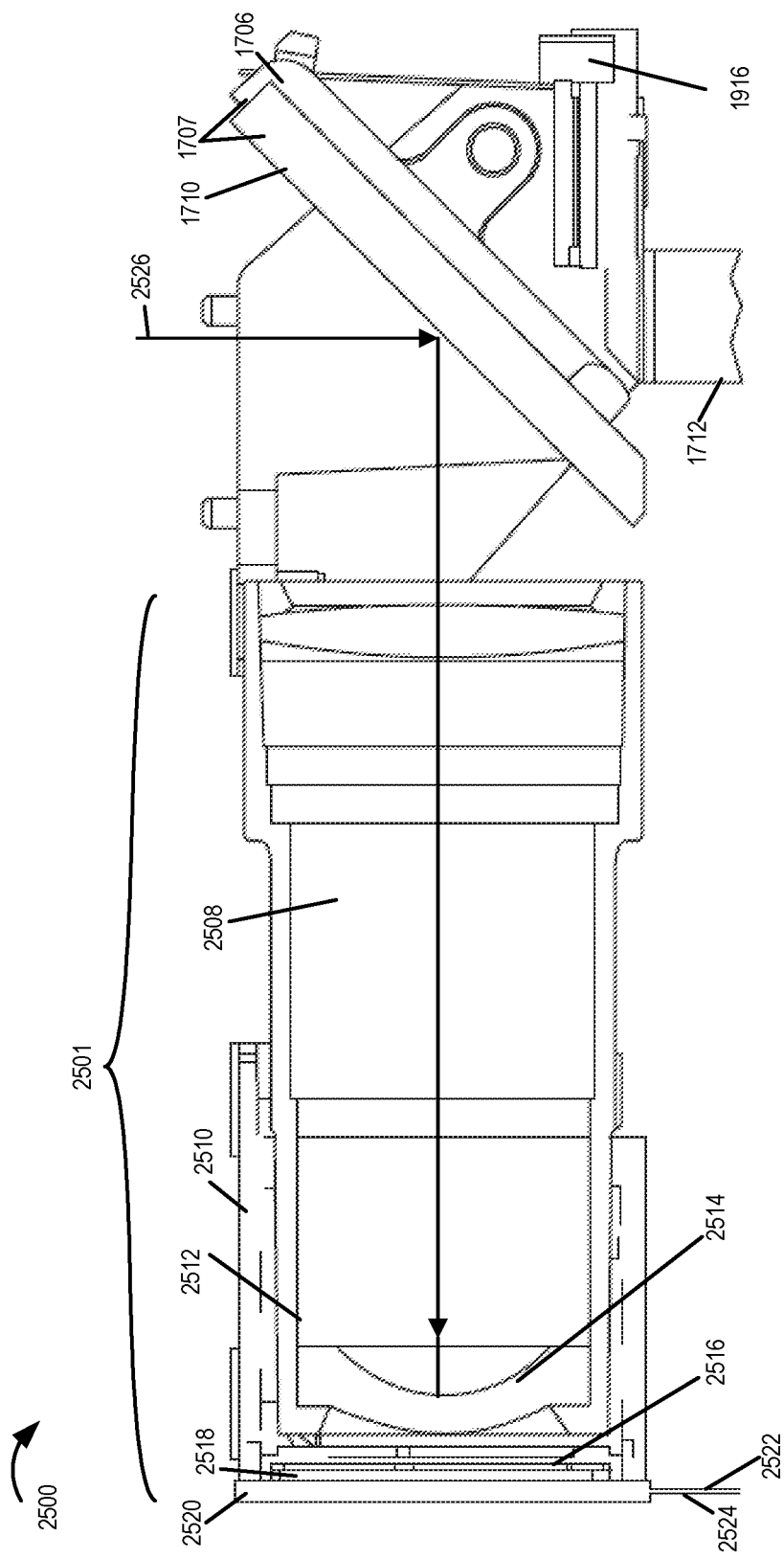
FIG. 13 illustrates a cutaway view of an exemplary 150 mm camera module, including a movable mirror portion and a lens barrel portion, and identifies components, features and/or aspects of the camera module.

FIG. 13 is a drawing 2500 illustrating components of an exemplary camera module, e.g., a 150 mm focal length camera module. The camera module includes a lens barrel assembly 2501, IR filter 2516, image sensor 2518, sensor mounting board 2520, barrel control assembly FCP 2522 and sensor FCP 2524. The lens barrel assembly 2501 includes lens barrel 2508, lens barrel holder 2510, a lens barrel drive motor 2512, and lens 2514. In the exemplary camera module of drawing 2500 mirror 1710 and mirror support cradle 1706, piezo electric actuator 1916 and mirror control FPC 1712 are also shown.

Lens barrel 2508 includes one or more lens movable mounted in the barrel holder 2510 allowing the barrel position control motor 2512 to drive the barrel in or out of holder 2510 to change the distance of one or more lenses to the sensor 2518. Barrel control assembly FCF 2522 couples the barrel drive motor 2512 to a processor which controls barrel position. The lens barrel drive motor 2512 is positioned under the lens barrel 2508 and coupled to the lens barrel FCB 2522 for driving the lens barrel 2508 in and out under processor control.

The IR filter 2516 is over the sensor 2518. The sensor 2518 is mounted in the sensor mounting board 2520. The sensor FCP 2524 couples the image sensor 2518 to an image processor of the camera.

In FIG. 13, an exemplary light path 2526 is also shown.

FIG. 8 shows a mirror support cradle 1706 with a flexible printed circuit/board 1712 that can be used in a moveable mirror portion 2602 of a camera module 2600. The mirror support cradle 1706 of FIG. 8 is shown in FIG. 9 as part of a movable mirror portion 2602 which can, and in some embodiments is used as part of a 150 mm camera module 2600. The movable mirror portion shown in FIG. 19 includes a piezoelectric actuator 1916 which is connected to a mirror drive rod 1914 which in turn makes contact with the bottom of the mirror support cradle 1706. The piezoelectric actuator 1916 pushes and pulls on the drive rod 1914 moving the mirror support cradle 1706 which is mounted using pivots (1804, 1804') which allow the mirror support cradle 1706 and mirror 1710 mounted therein to move and change by a number of degrees. Thus during use the mirror 1710 can move in position from an angle of less than 45 degrees relative to the sensor of the corresponding module to an angle over 50 degrees. In some embodiments the range of motion is between 43 and 53 degrees. The moveable mirror portion 2602 includes a flexible printed circuit board 1712 which is coupled to the piezoelectric actuator 1916 and a hall sensor 2204 (see FIG. 12). The hall sensor 2204 may be a hall sensor position encoder which generates electrical signals indicating the position of the sensor relative to a magnet mounted on the mirror support assembly. A processor in the camera can and does control the position of the mirror of each camera module using closed loop position control driving the mirror modules actuator and monitoring the feedback from the hall sensor to drive and maintain the mirror cradle and thus mirror at the desired position for a given image capture operation. The position of the mirror 1710 may be changed based on zoom setting and/or for other reasons under control of the processor.

A sensor is included on a sensor mounting board at the back of each camera module assembly and is coupled to a camera processor by a sensor flex printed circuit board. Another FPC couples a barrel drive motor included in the barrel assembly to the processor. While 70 and 150 mm camera modules include mirror with no lenses before the mirror but simply a flat glass or plastic covering over the module opening in the camera, 35 mm modules do not include a mirror in some embodiments and face straight out. By avoiding the use of lenses before the mirror camera thickness can be minimized sense space need not be provided in front of the mirror for the lenses which might otherwise be present.

The camera modules are mounted on the mounting board located towards the front of the camera. Behind the mounting board may be and sometimes is a PC board on which the camera's processor is mounted and a display may be and normally is included behind the PC board. By using camera modules of different sizes, some with mirror and some without, a higher camera module packing density can be achieved for a given area than might be the case if only modules of a single size were used.

A recess is included in a mounting board to allow the bottom of the mirror or a portion of the mirror mounting hinge to be placed below the surface of the mounting board to which the camera module is secured.

The camera devices of the present invention supports multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Figure 14:
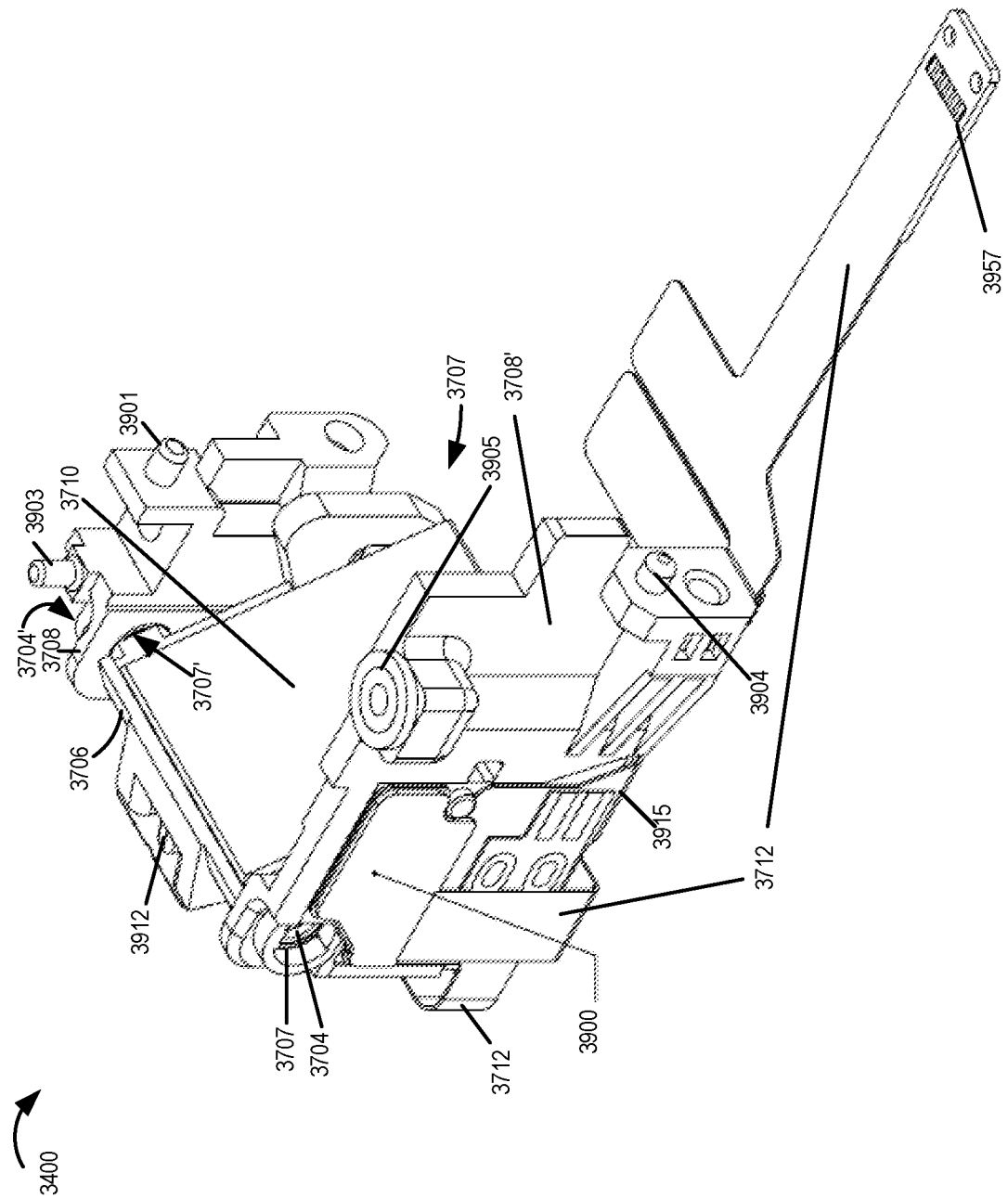
FIGS. 14, 15, 16, 17 and 18 show various views of an exemplary mirror assembly which may, and sometimes is, used as the mirror assembly of the camera modules in the other figures including the camera module shown in FIG. 5.

FIGS. 14 though 18 illustrate various views of a mirror assembly 3400 which can be used as the mirror assembly of any one of the camera modules shown in the other figures of the present application which include a mirror. Thus the mirror assembly could be used in the camera module of FIG. 5, FIG. 13 or in any of the other camera modules in which a mirror is used. Many of the elements of the mirror assembly 3400 are the same or similar to those of other figures and thus will not be discussed again in detail.

Figure 18:
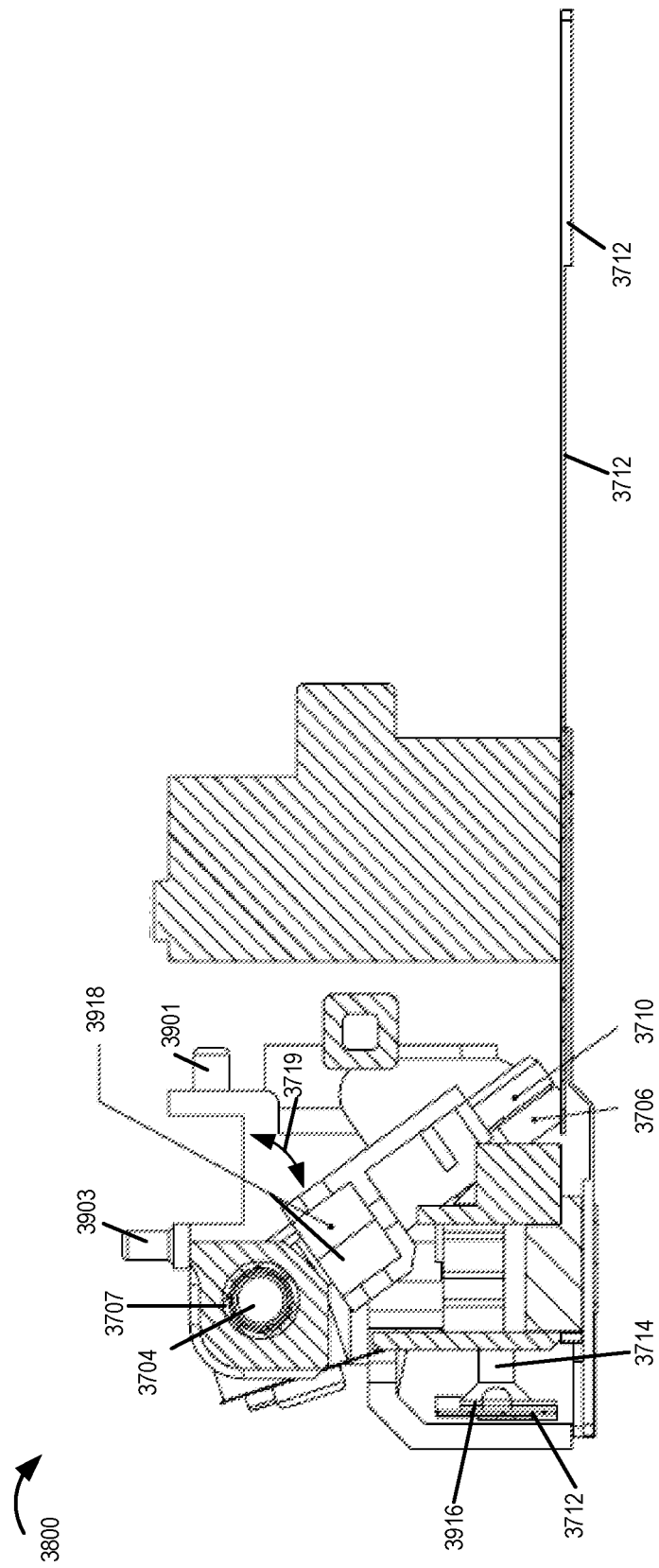

In the assembly shown in FIG. 14 through FIG. 18 a magnetic metal plate 3900, not shown in the other figures, is used to facilitate reliable positioning and measurement of the position of the mirror 3710 by reducing the potential for side to side motion of a mirror support cradle 3706 and mirror 3710 mounted therein. In the embodiment shown in FIGS. 14 through 18 one or more magnets 3918 (see FIG. 18) attached to the mirror support cradle 3706 will be attracted towards the magnetic plate 3900 pulling the support cradle 3706 and mirror 3710 towards the magnetic side plate 3900 helping to maintain the position of the support cradle 3706 relative to the sidewall support 3708' shown in FIG. 14. The arrow 3719 in FIG. 18 shows the cradle 3706 and mirror 3710 can move along a path, e.g., rotating about an axis corresponding to pin 3704.

Figure 15:
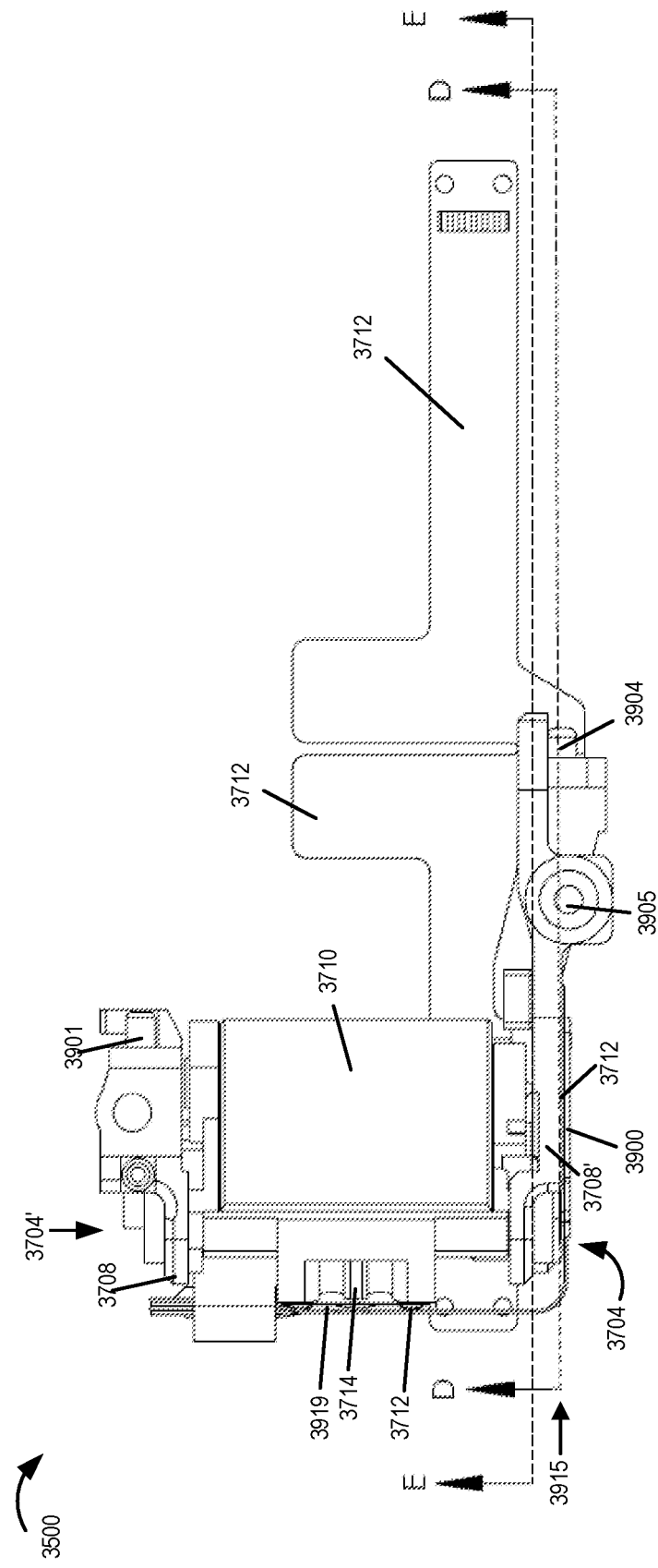
Figure 16:
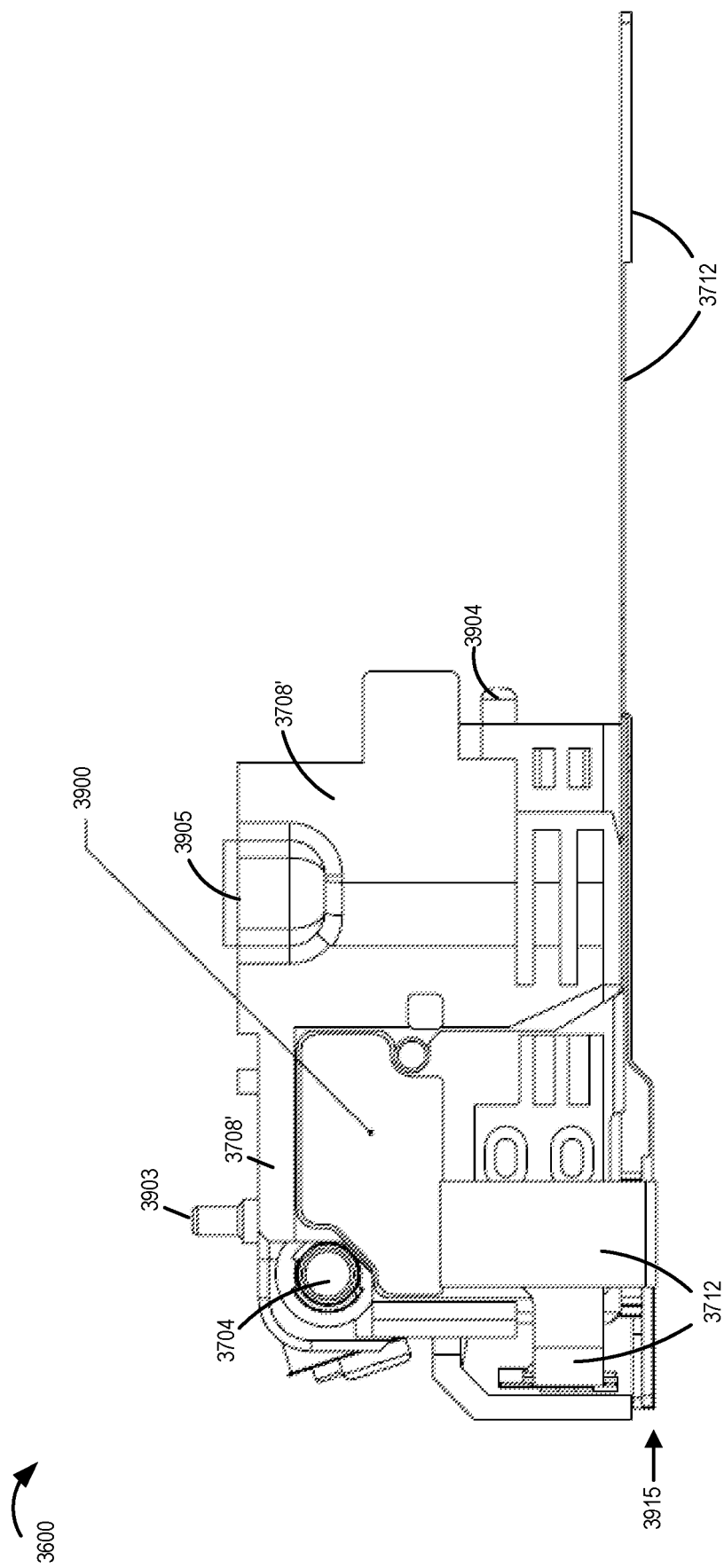

FIG. 14 is an angled view of the mirror assembly 3400 shown in FIGS. 15-18. FIG. 15 is a top view 3500 of the mirror assembly shown in FIG. 14 with cross section locations D (corresponding to FIG. 17) and cross section E (corresponding to FIG. 18) shown. FIG. 16 shows a side view of the mirror assembly 3400 without any portions being sliced away.

Referring now to FIG. 14 various components of the mirror assembly 3400 can be seen. The components of the mirror assembly 3400 include a moveable element, e.g., a mirror cradle 3706. A first shaft, e.g., pin 3704 of mirror cradle 3706 is part of a shaft which is attached to or an integral part of the moveable element (3706). The pins may be part of the mirror cradle in embodiments where the pins and cradle are molded as a single component, e.g., out of plastic. The pins which form a shaft may be attached to the mirror support cradle 3706 e.g., glued or clipped onto the movable element (3706) in embodiments where the pins 3704 and 3704' are part of a metal shaft to which the mirror support cradle 3706 is mounted. Positioned in the mirror support cradle 3706 is a mirror 3710 which moves with the mirror support cradle 3706. The mirror 3710 may be, and sometimes is, glued to the mirror support cradle 3706 or clipped into the mirror cradle 3706. The moveable mirror 3710 support cradle 3706 and mirror 3710 form a moveable mirror assembly 3707 which may be, and sometimes is, treated as a single moveable component.

The pins of 3704 and 3704' on each side of the moveable mirror support cradle 3706 are inserted into holes 3707, 3707' in the first support wall 3708' and second support wall 3708, respectively. The pins 3704, 3704' maybe and sometimes are part of the same shaft or act as separate shafts. The support cradle 3706 can rotate around the axis of the pins 3704, 3704' and with the lower portion of the mirror 3710 moving up as the support cradle 3706 rotates to move the bottom of the mirror 3710 away from the bottom 3915 (see FIG. 15) of the side support wall 3708'.

The pins 3704, 3704', which act as a hinge and which allow the mirror support cradle 3706 to be moved, fit loosely in the holes 3707, 3707'. This allows the mirror support cradle to be easily moved by use of a linear actuator 3919 which pushes a drive pin 3714 (see FIG. 15) and with a return spring 3912 forcing the moveable mirror cradle 3706 against the drive pin 3714. To understand the drive mechanism see FIG. 12 which shows a similar drive arrangement to the one used in the FIG. 14 embodiments.

In FIG. 14 various components such as the magnetic metal plate 3900 are shown fixed to the first support wall 3708'. A flexible circuit, e.g., flex tape, 3712 is shown extending along the bottom of the mirror assembly and up the side under the plate 3900 and wrapping around the back. The flex tape 3712 is used to receive electrical signals from a hall sensor 3917 attached to the flex tap 3710 and positioned at a fixed location relative to the first support wall 3708'. In some embodiments the hall sensor 3917 extends partially or fully through an opening 3710 in the first support wall 3708' putting it in a position well suited to detect a distance to one or more magnets 3918 secured, e.g., glued or clipped, to the moveable mirror support cradle 3706. In the illustrated embodiment the flex tape 3712 is used to communicate position signal information from the hall sensor 3917 to a processor of a camera in which the mirror assembly is included and the processor sends signals over the flex tape 3712 to a position drive 3919 to drive the moveable mirror support cradle 3706 and thus mirror 3710 to a desired position, e.g., mirror angle. Thus it should be appreciated that the processor in some embodiments converts the distance determined based on the output of the hall sensor 3917 to a mirror angle and controls the drive 3919 to position the mirror to a desired angle.

Since the distance between the hall sensor, sometimes referred to as a halifax sensor, to the magnet 3918 will be converted into a mirror position angle, it is important that changes in distance be due to mirror rotation as opposed to the mirror cradle shifting position, e.g., sliding left to right, between the support sidewalls 3708' and 3708 if the angle determination is to be accurate.

In accordance with the invention a magnetic metal plate 3900 is attached along the side of the support wall 3708' in which the pivot pin 3704 is mounted. The magnet or magnets 3918 which are secured, e.g., glued to the side or rear of the moveable mirror support cradle 3706 are present to allow the hall effect sensor 3917 to detect distance to the magnets 3918 and thus measure distance to a known point on the mirror support cradle 3706. The addition of the magnetic metal plate 3900 behind the flex tape 3712 and hall effect sensor 3917 has the advantage of attracting the magnets 3918 towards the side support wall 3708' and thereby maintaining a uniform distance to the support wall as the support cradle 3706 rotates even though the pins 3704 and 3704' fit loosely in the support holes which may be part of collars or cylinders mounted or molded into the side support walls 3708' and 3708.

In addition to the already discussed components FIG. 14 shows alignment pins 3901, 3903, 3904 which can be used to align the mirror assembly 3400 with other components such as a lens barrel assembly which includes alignment holes into which the alignment points 3901 and 3904 may be inserted. Alignment pint 3903 is used to facilitate alignment and position of the mirror assembly 3400 into a mounting board. Threaded holed 3905 is present for receiving a screw which passes through the mounting board to which the mirror assembly 3400 is mounted. The mounting board includes, in some embodiments a hole which allows light passing through an opening in the face of the camera to pass through the hole, hit the mirror 3710 and be directed towards a sensor of a camera module which includes the mirror assembly 3400.

At the far end of the flex tape 3712 are electrical connectors 3957 which appear as lines and can be used to connect the flex tape to a bus to allow communication with a processor in a camera which can control camera position and use hall sensor output to determine the angle at which the mirror 3710 is positioned at a given time.

The various components of the camera 3400 shown in FIG. 14 have already been discussed and thus will not be discussed in great detail again. However, it should be appreciated that FIG. 15-18 help in understanding the relationship between the components by showing different views and/or cross sections of the mirror assembly 3400. For example FIG. 15 shows a top view which can be used to understand the location of the cross sections shown in FIGS. 17 and 18.

FIG. 16 shows a side view with the metal plate 3900 secured to the sidewall 3708' shown. The plate extends generally parallel to a portion of the sidewall 3708' and the path of motion of the mirror 3710 which rotates with the mirror support cradle 3706 around the axis of pins 3704, 3704'. The metal plate 3900 covers the hall effect sensor 3917 which is attached to the flex tape 3712. The attachment between the hall effect sensor 3917 and flex tape 3712 is not visible in the FIG. 17 cross section but it should be noted that a portion of the flex tape 3712 is sandwiched between the metal plate 3900 and sensor 3917 and in contact with the sensor 3917. The sensor 3917 which is in electrical contact with the flex tape 3712 extends fully or partially though opening 3721 in the sidewall 3708' as shown in FIG. 17.

FIG. 18 shows a drawing 3800 corresponding to cross section E of FIG. 15 with most of the sidewall 3708' having been removed so that the position of the magnets 3918 which are glued or pressed into the side of the support cradle 3706 are visible as well as the pivot pin 3704 and hole 3707.

While explained in the context of a mirror support included in a camera module of a camera, the use of a metal side plate, that is attracted to a magnet which is also used by a hall sensor, has a wide range of uses where a magnet is present for hall sensor purposes and it may be desirable to limit sideways motion of a moveable component. The addition of a simple magnetic metal plate allows the magnet used to support distance measurements to serve double duty and reduce or eliminate undesired sideways motion without adding a great deal of friction.

Various exemplary numbered embodiments will now be discussed to facilitate a better understanding of the invention. The numbered embodiments are exemplary and are not intended to be in any way limiting.

Exemplary numbered device embodiment 1 is directed to a device 3400 comprising a moveable element, e.g., mirror support cradle 3706, a magnet 3918 secured to said moveable element, e.g., mirror cradle 3706, a first shaft, e.g., pin 3704 of mirror cradle 3706, said first shaft 3704 being attached to, e.g., glued or clipped on the movable element (3706) or an integral part of the moveable element 3706, a first shaft support 3708', e.g., first sidewall of mirror support assembly that includes the first support wall 3708' and the second support wall 3708 with a hole 3707 that receives first shaft 3704 into which at least a portion of said first shaft 3704 extends, said first shaft 3704 being rotatable while inserted into the first shaft support 3708'. The first numbered embodiment further includes a hall effect senor 3917 located at a fixed position with respect to said first shaft support 3708'. A distance between said magnet 3918 secured to the movable element 3706 and the fixed position where the hall sensor is mounted varying as a function of the movement of the moveable element 3706. The first numbered embodiment further includes a magnetic metal plate 3900 towards which said magnet 3918 is attracted, said magnetic metal plate being on a side of said first shaft support 3708'.

Numbered device embodiment 2 is directed to the device embodiment 1, wherein said magnetic metal plate 3900 is positioned along a side of said first shaft support 3708' adjacent a path 3719 which said moveable element 3706 moves when the position of the moveable element 3706 is changed.

Numbered device embodiment 3 is directed to device embodiment 2, wherein the hall effect sensor 3917 is positioned between the magnetic metal plate 3900 and said magnet 3918.

Numbered device embodiment 4 is directed to the device of embodiment 3, wherein the hall effect sensor 3917 is mounted on a circuit tape 3712 to which the hall effect sensor 3917 is secured, said hall effect sensor 3917 extending at least partially through an opening 3721 in the first shaft support 3708'.

Numbered device embodiment 5 is directed to the device of embodiment 4, wherein the circuit tape 3712 is positioned between the magnetic metal plate 3900 and the first shaft support 3708'.

Numbered device embodiment 6 is directed to the device of embodiment 5, wherein said circuit tape 3712 is connected to a linear actuator 3916 which can alter the position of the moveable element 3706.

Numbered device embodiment 7 is directed to the device of embodiment 5, wherein said first shaft support 3708' supports a first side of said moveable element 3706 and wherein the device 3400 further comprises a second shaft support 3708 for supporting a second side of the moveable element 3706.

Numbered device embodiment 8 is directed to the device of embodiment 7 further comprising: a second shaft, e.g., second pin 3704' of mirror cradle 3706, said second shaft being attached to, e.g., glued or clipped on the first shaft, the movable element 3706 or an integral part of the moveable element 3706 and said second shaft extending through at least a portion of the second shaft support 3708.

Numbered device embodiment 9 is directed to the device of embodiment 8, wherein said second shaft, e.g., second pin 3704' of mirror cradle 3706, extends at least partially into a hole 3707' that receives the second shaft, e.g., 3704' pin of mirror cradle, into which at least a portion of said second shaft (3704' extends, said second shaft 3704' being rotatable while inserted into said second shaft support, e.g., support sidewall 3708.

Numbered device embodiment 10 is directed to the device of embodiment 1, wherein the moveable element 3706 is a mirror support, e.g., mirror support cradle 3706, in which a mirror 3710 of a camera module 500 is mounted.

Numbered device embodiment 11 is directed to the device of embodiment 10, further comprising: a piezoelectric actuator 3916 for driving the moveable element, e.g., mirror support cradle 3706 in a direction parallel to the direction in which the magnetic metal plate 3900 extends along the first shaft support 3708', said first shaft 3704 operating as part of a hinge, e.g., assembly including first shaft 3704 and second shaft 3704', allowing the mirror 3710 to change its angle with respect to a bottom 3905 of said first shaft support 3708'.

Numbered device embodiment 12 is directed to the device of embodiment 11, wherein said magnet 3918 is attracted to said magnetic metal plate 3900 thereby pulling the moveable element, e.g., mirror support cradle 3706, to which the magnet 3918 is attached towards the magnetic metal plate 3900 and reducing or avoiding side to side movement of the movable element, e.g., mirror support cradle 3706, between said first shaft support 3708' and said second shaft support 3708 during movement of the moveable element, e.g., mirror support cradle 3706.

Numbered device embodiment 13 is directed to the device for use in a camera module 500, the device 3400 comprising: a moveable mirror support, e.g., mirror support cradle 3706; a magnet 3918 secured to said moveable mirror support, e.g., moveable mirror cradle 3706, a first shaft, e.g., pin 3704 of mirror cradle 3706, said first shaft 3704 being attached to the moveable mirror support 3706 or being an integral part of the moveable mirror support 3706, a first support wall 3708', e.g., sidewall of mirror support assembly including supports first support wall 3708' and second support wall 3708, into which a portion of said first shaft 3704 extends, said first shaft being rotatable while inserted into said first support wall 3708', a hall effect senor 3917 located at a fixed position with respect to said first support wall 3708', a distance between said magnet 3918 secured to the movable mirror support and the fixed position varying as a function of movement of the moveable mirror support 3706; and a magnetic metal plate 3900 towards which said magnet 3918 is attracted, said magnetic metal plate 3900 being on a side of said first support wall 3708'.

Numbered device embodiment 14 is directed to the device of embodiment 13, wherein said first support wall 3708' supports a first side of said moveable mirror support, e.g., mirror cradle 3706, and wherein the device 3400 further comprises a second support wall 3708 for supporting a second side of the moveable mirror support, e.g., mirror cradle 3706.

Numbered device embodiment 14 is directed to the device of embodiment 14 further comprising a second shaft, e.g., second pin 3704' of mirror cradle 3706, said second shaft being attached to, e., glued or clipped on to the movable mirror support 3706 or an integral part of the moveable mirror support 3706 and said second shaft extending through a portion of the second support wall 3708.

Numbered device embodiment 16 is directed to the device of embodiment 15, wherein said second shaft, e.g., second pin 3704' of mirror cradle 3706, extends at least partially into a hole 3707' that receives the second shaft, e.g., pin 3704' of mirror cradle 3706, into which at least a portion of said second shaft 3704' extends, said second shaft 3704' being rotatable while inserted into said second shaft support, e.g., support sidewall 3708.

Numbered device embodiment 17 is directed to the device of embodiment 16, further comprising: a mirror 3710 mounted in said moveable mirror support (mirror support cradle 3706).

Numbered device embodiment 18 is directed to the device of embodiment 17, further comprising a piezoelectric actuator 3916 for driving the moveable mirror support, e.g., mirror support cradle 3706, in a direction parallel to the direction in which the magnetic metal plate 03900 extends along the first shaft support 3708', said first shaft pin 3704 operating as part of a hinge. The hinge assembly includes first pin 3704 and second pin 3704'. The hinge assembly allows the mirror 3710 in embodiment 18 to change its angle with respect to a bottom 3905 of said first support wall 3708'.

Numbered device embodiment 19 is directed to the device of embodiment 18, wherein said magnet 3918 is attracted to said magnetic metal plate 3900 thereby pulling the moveable mirror support, e.g., mirror support cradle 3706, to which the magnet 3918 is attached towards the magnetic metal plate 3900 and reducing or avoiding side to side movement of the moveable mirror support 3706 between said first support wall 3708' and said second support wall 3708 during movement of the moveable mirror support, e.g., mirror support cradle 3706.

Numbered device embodiment 20 is directed to the device of embodiment 13, wherein said device is a handheld camera device; and wherein said moveable mirror support is included in a camera module which includes a sensor; and wherein said handheld camera device further includes: a plurality of at least three additional camera modules each additional camera module including a separate moveable mirror support, hall sensor, magnet and metal plate.

Various features related to methods and apparatus for implementing optical chains, e.g., camera modules, which can be used in a camera device as well as camera devices including multiple camera modules. In various embodiments one or more camera modules include mirror assemblies which support a movable mirror. The mirror is driven in some embodiments by a linear actuator, e.g., piezo electric actuator with the linear motion of the actuator's push rod being converted into angular mirror rotation by use of hinge, e.g., pivot in the form of a shaft or set of shaft pins, on which the mirror is mounted. A return spring provides a force contrary to that provided by the actuator. A magnet is attached to a moveable support which holds the mirror and a hall sensor is mounted at a fixed location. The position of the magnet relative to the hall sensor is determined based on the output of the sensor and the angle of the mirror determined. To keep the mirror and support from sliding left to right a magnetic metal plate is positioned adjacent the path along which the mirror and support are to rotate, e.g., by securing the plate to a support wall in which the shaft holding the mirror support and mirror extends. The magnet which also facilitates distance measurement pulls the mirror support and thus mirror towards the sidewall reducing the risk of the shaft and mirror sliding between the two sidewall supports as the mirror rotates. By reducing the risk of side to side movement more accurate measurements of the mirror position and thus mirror angle can be made than if the mirror support and mirror was allowed to shift sideways as well as rotate around the axis of the support shaft.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A device comprising:
a moveable element;
a magnet secured to said moveable element;
a first shaft, said first shaft being attached to the moveable element or an integral part of the moveable element;
a first shaft support with a hole that receives the first shaft extending in a first direction into the hole of the first shaft support, said first shaft being rotatable around said first direction while inserted into said first shaft support, said first shaft support extending in a second direction perpendicular to said first direction;
a hall effect sensor located at a fixed position with respect to said first shaft support, a distance between said magnet secured to the moveable element and the fixed position varying as a function of the movement of the moveable element; and
a magnetic metal plate extending in said second direction, said magnetic metal plate being on a first side of said first shaft support, said magnet being attracted in the direction of the first side of said first shaft support on which said magnetic metal plate is mounted, said magnet pulling the moveable element to which it is secured in the first direction toward the first side of said first shaft support.

2. The device of claim 1,
wherein said magnetic metal plate is positioned along a side of said first shaft support.

3. The device of claim 2, further comprising:
a second shaft support including a second side extending in said second direction parallel to said first direction; and
wherein the hall effect sensor is positioned between the magnetic metal plate and said magnet.

4. The device of claim 1, wherein the moveable element is a mirror support in which a mirror of a camera module is mounted.

5. A device comprising:
a moveable element;
a magnet secured to said moveable element;
a first shaft, said first shaft being attached to the moveable element or an integral part of the moveable element;
a first shaft support with a hole that receives the first shaft and into which at least a portion of said first shaft extends, said first shaft being rotatable while inserted into said first shaft support;
a hall effect sensor located at a fixed position with respect to said first shaft support, a distance between said magnet secured to the moveable element and the fixed position varying as a function of the movement of the moveable element; and
a magnetic metal plate towards which said magnet is attracted, said magnetic metal plate being on a side of said first shaft support;
wherein said magnetic metal plate is positioned along a side of said first shaft support adjacent a path along which said moveable element moves when the position of the moveable element is changed;
wherein the hall effect sensor is positioned between the magnetic metal plate and said magnet; and
wherein the hall effect sensor is mounted on a circuit tape to which the hall effect sensor is secured, said hall effect sensor extending at least partially through an opening in the first shaft support.

6. The device of claim 5, wherein the circuit tape is positioned between the magnetic metal plate and the first shaft support.

7. The device of claim 6, wherein said circuit tape is connected to a linear actuator which can alter the position of the moveable element.

8. The device of claim 6,
wherein said first shaft support supports a first side of said moveable element and
wherein the device further comprises:
a second shaft support for supporting a second side of the moveable element.

9. The device of claim 8 further comprising:
a second shaft, said second shaft being attached to the moveable element or an integral part of the moveable element, said second shaft extending through a portion of the second shaft support.

10. The device of claim 9, wherein said second shaft, extends at least partially into a hole that receives the second shaft into which at least a portion of said second shaft extends, said second shaft being rotatable while inserted into said second shaft support.

11. A device comprising:
a moveable element, said moveable element being a mirror support in which a mirror of a camera module is mounted;
a magnet secured to said moveable element;
a first shaft, said first shaft being attached to the moveable element or an integral part of the moveable element;
a first shaft support with a hole that receives the first shaft extending in a first direction into the hole of the first shaft support, said first shaft being rotatable around said first direction while inserted into said first shaft support, said first shaft support extending in a second direction perpendicular to said first direction;
a hall effect sensor located at a fixed position with respect to said first shaft support, a distance between said magnet secured to the moveable element and the fixed position varying as a function of the movement of the moveable element;

a magnetic metal plate extending in said second direction, said magnetic metal plate being on a first side of said first shaft support, said magnet being attracted in the direction of the first side of said first shaft support on which said magnetic metal plate is mounted; and a piezoelectric actuator for driving the moveable element in a direction parallel to the direction in which the magnetic metal plate extends along the first shaft support, said first shaft operating as part of a hinge allowing the mirror to change its angle with respect to a bottom of said first shaft support.

12. The device of claim 11, wherein said magnet is attracted to said magnetic metal plate thereby pulling the moveable element to which the magnet is attached towards the magnetic metal plate and reducing or avoiding side to side movement of the moveable element between said first shaft support and said second shaft support during movement of the moveable element.

13. A device, the device comprising:
a first camera module including:
an image sensor;
a moveable mirror support;
a magnet secured to said moveable mirror support;
a first shaft, said first shaft being attached to the moveable mirror support or being an integral part of the moveable mirror support;
a first support wall into which a portion of said first shaft extends in a first direction, said first shaft being rotatable around said first direction while inserted into said first support wall, said first support wall extending in a second direction perpendicular to said first direction;
a hall effect sensor located at a fixed position with respect to said first support wall, a distance between said magnet secured to the moveable mirror support and the fixed position varying as a function of movement of the moveable mirror support; and
a magnetic metal plate extending in said second direction, said magnetic metal plate being on a side of said first support wall, said magnet being attracted in the direction of the side of said first support wall; and
a plurality of at least three additional camera modules, each additional camera module including a separate moveable mirror support, hall effect sensor, magnet and metal plate; and
wherein said device is a handheld camera device.

14. The device of claim 13,
wherein said first support wall supports a first side of said moveable mirror support; and
wherein the first camera module further includes:
a second support wall for supporting a second side of the moveable mirror support.

15. The device of claim 14, wherein said first camera module further includes:
a second shaft, said second shaft being attached to the moveable mirror support or an integral part of the moveable mirror support, said second shaft extending through a portion of the second support wall.

16. The device of claim 15, wherein said second shaft extends at least partially into a hole that receives the second shaft into which at least a portion of said second shaft extends, said second shaft being rotatable while inserted into said second support wall.

17. The device of claim 16, wherein said first camera module further includes:
a mirror mounted in said moveable mirror support.

18. A device, the device comprising:
a moveable mirror support;
a magnet secured to said moveable mirror support;
a first shaft, said first shaft being attached to the moveable mirror support or being an integral part of the moveable mirror support;
a first support wall into which a portion of said first shaft extends, said first shaft being rotatable while inserted into said first support wall;
a hall effect sensor located at a fixed position with respect to said first support wall, a distance between said magnet secured to the moveable mirror support and the fixed position varying as a function of movement of the moveable mirror support;
a magnetic metal plate towards which said magnet is attracted, said magnetic metal plate being on a side of said first support wall;
a mirror mounted in said moveable mirror support; and
a piezoelectric actuator for driving the moveable mirror support in a direction parallel to the direction in which the magnetic metal plate extends along the first support wall, said first shaft operating as part of a hinge allowing the mirror to change its angle with respect to a bottom of said first support wall.

19. The device of claim 18, wherein said magnet is attracted to said magnetic metal plate thereby pulling the moveable mirror support to which the magnet is attached towards the magnetic metal plate and reducing or avoiding side to side movement of the moveable mirror support between said first support wall and a second support wall during movement of the moveable mirror support.

* * * * *